United States Patent
Saisho et al.

(10) Patent No.: US 10,502,972 B2
(45) Date of Patent: *Dec. 10, 2019

(54) IMAGE DISPLAY DEVICE AND MOBILE OBJECT

(71) Applicant: RICOH COMPANY, LTD., Tokyo (JP)

(72) Inventors: Kenichiroh Saisho, Tokyo (JP); Makoto Inamoto, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/011,209

(22) Filed: Jun. 18, 2018

(65) Prior Publication Data

US 2018/0307056 A1 Oct. 25, 2018

Related U.S. Application Data

(63) Continuation of application No. 15/111,668, filed as application No. PCT/JP2015/053719 on Feb. 4, 2015, now Pat. No. 10,031,343.

(30) Foreign Application Priority Data

Feb. 5, 2014 (JP) ................... 2014-020221

(51) Int. Cl.
*G09G 5/00* (2006.01)
*G02B 27/48* (2006.01)
(Continued)

(52) U.S. Cl.
CPC ........... *G02B 27/48* (2013.01); *G02B 3/0006* (2013.01); *G02B 27/0081* (2013.01);
(Continued)

(58) Field of Classification Search
CPC ...... G02B 3/00; G02B 3/0006; G02B 3/0056; G02B 26/101; G02B 27/0081;
(Continued)

(56) References Cited

U.S. PATENT DOCUMENTS

| 5,502,456 A | 3/1996 | Korenaga |
| 5,864,432 A | 1/1999 | Deter |

(Continued)

FOREIGN PATENT DOCUMENTS

| CN | 101900881 A | 12/2010 |
| CN | 102736249 A | 10/2012 |

(Continued)

OTHER PUBLICATIONS

International Search Report dated Apr. 21, 2015 in PCT/JP2015/053719 filed on Feb. 4, 2015.

(Continued)

*Primary Examiner* — Joe H Cheng
(74) *Attorney, Agent, or Firm* — Oblon, McClelland, Maier & Neustadt, L.L.P.

(57) ABSTRACT

An image display device including a laser light source; an optical element; and a transmitting-reflecting member, the image display device which displays an image by forming the image by light which is emitted from the laser light source and making image light after forming the image to be incident on the transmitting-reflecting member, wherein the laser light source is arranged such that there are more S polarization components of the image light which is incident on the transmitting-reflecting member with respect to the transmitting-reflecting member than P polarization components, and a mobile object including the image display device.

13 Claims, 9 Drawing Sheets

(51) Int. Cl.
*H04N 9/31* (2006.01)
*G02B 27/01* (2006.01)
*G03B 21/20* (2006.01)
*G02B 27/00* (2006.01)
*G02B 3/00* (2006.01)
G02B 26/10 (2006.01)
G02B 27/10 (2006.01)
G02B 27/09 (2006.01)

(52) U.S. Cl.
CPC ..... *G02B 27/0101* (2013.01); *G03B 21/2073* (2013.01); *H04N 9/3129* (2013.01); *H04N 9/3161* (2013.01); G02B 3/0056 (2013.01); G02B 26/101 (2013.01); G02B 27/0905 (2013.01); G02B 27/0911 (2013.01); G02B 27/0961 (2013.01); G02B 27/1033 (2013.01); G02B 2027/0114 (2013.01); G02B 2027/0118 (2013.01); G02B 2027/0123 (2013.01)

(58) Field of Classification Search
CPC ............... G02B 27/01; G02B 27/0101; G02B 27/0905; G02B 27/0911; G02B 27/0961; G02B 27/10; G02B 27/1033; G02B 27/48; G02B 2027/0114; G02B 2027/0118; G02B 2027/0123; G03B 21/2073; H04N 9/3129; H04N 9/3161
See application file for complete search history.

(56) References Cited

U.S. PATENT DOCUMENTS

| | | | |
|---|---|---|---|
| 7,031,067 B2 | 4/2006 | Voloschenko | |
| 7,131,728 B2 | 11/2006 | Nambudiri | |
| 7,589,900 B1 | 9/2009 | Powell | |
| 9,158,124 B2* | 10/2015 | Saisho | G02B 26/101 |
| 9,746,669 B2 | 8/2017 | Saisho | |
| 9,798,140 B2 | 10/2017 | Inamoto | |
| 10,031,343 B2* | 7/2018 | Saisho | G02B 27/0101 |
| 2001/0036014 A1* | 11/2001 | Sasano | G02B 3/0018 |
| | | | 359/619 |
| 2004/0008412 A1 | 1/2004 | Jiang et al. | |
| 2005/0012682 A1 | 1/2005 | Jenson et al. | |
| 2005/0237488 A1* | 10/2005 | Yamasaki | G02B 27/0911 |
| | | | 353/20 |
| 2008/0002753 A1 | 1/2008 | Timans | |
| 2009/0135374 A1 | 5/2009 | Horiuchi | |
| 2009/0160736 A1 | 6/2009 | Shikita | |
| 2009/0161074 A1 | 6/2009 | Shinozaki et al. | |
| 2009/0194666 A1 | 8/2009 | Takamoto | |
| 2009/0279573 A1 | 11/2009 | Mizuuchi | |
| 2011/0122172 A1 | 5/2011 | Tanigawa et al. | |
| 2011/0128602 A1 | 6/2011 | Hamano | |
| 2012/0188652 A1 | 7/2012 | Kang | |
| 2013/0050655 A1 | 2/2013 | Fujikawa et al. | |
| 2013/0050834 A1 | 2/2013 | Fujikawa | |
| 2013/0063754 A1 | 3/2013 | Saisho | |
| 2013/0094092 A1 | 4/2013 | Imahori | |
| 2014/0038324 A1 | 2/2014 | Tanigawa et al. | |
| 2015/0219803 A1* | 8/2015 | Inamoto | G02B 3/0043 |
| | | | 359/627 |
| 2016/0373704 A1 | 12/2016 | Akiyama | |
| 2017/0154558 A1 | 6/2017 | Atsuumi | |

FOREIGN PATENT DOCUMENTS

| | | |
|---|---|---|
| EP | 0 724 174 A1 | 7/1996 |
| JP | 2-141720 | 5/1990 |
| JP | 2006-11168 A | 1/2006 |
| JP | 2006-072370 A | 3/2006 |
| JP | 2006-142587 | 6/2006 |
| JP | 4200223 | 10/2008 |
| JP | 2008-275971 | 11/2008 |
| JP | 2009-132010 | 6/2009 |
| JP | 2010-104927 A | 5/2010 |
| JP | 2010-145924 A | 7/2010 |
| JP | 2011-112737 | 6/2011 |
| JP | 2013-47705 | 3/2013 |
| JP | 2014-26088 | 2/2014 |
| WO | WO 99/49358 A1 | 9/1999 |
| WO | WO 2012/117495 A1 | 9/2012 |

OTHER PUBLICATIONS

Extended European Search Report dated Dec. 20, 2016 in Patent Application No. 15746031.2.
Combined Office Action and Search Report dated Nov. 17, 2017 in Chinese Patent Application No. 201580006165.2 (with English language translation), 19 pages.
Office Action dated Dec. 29, 2017 in Korean Patent Application No. 10-2016-7024265 (with English language translation), 12 pages.

* cited by examiner

IMAGE DISPLAY DEVICE AND MOBILE OBJECT

CROSS REFERENCE TO RELATED APPLICATIONS

This application is a continuation of U.S. application Ser. No. 15/111,668, filed Jul. 14, 2016, now U.S. Pat. No. 10,031,343 B2, which is a National Stage of PCT/JP2015/053719, filed Feb. 4, 2015 and claims the benefit of priority under 35 U.S.C. § 119 of Japanese Patent Application No. 2014-020221, filed Feb. 5, 2014. The entire contents of each of the above-identified applications are incorporated herein by reference.

TECHNICAL FIELD

The present invention relates to an image display device and a mobile object, and more specifically, relates to an image display device which makes it possible to visually recognize a virtual image formed by light via a transmitting-reflecting member and a mobile object in which the image display device is mounted.

BACKGROUND ART

Conventionally, a head-up display device is known which makes it possible to visually recognize a virtual image of an image formed by light via a vehicle windshield (transmitting-reflecting member) (for example, Japanese Patent Application Publication Number H02-141720).

SUMMARY OF THE INVENTION

However, in the head-up display device disclosed in Japanese Patent Application Publication Number H02-141720, there is a room for improvement for visibility of a virtual image.

An object of the present invention is to provide an image display device which makes it possible to visually recognize a virtual image formed by light via a transmitting-reflecting member.

In order to achieve the above object, an embodiment of the present invention provides an image display device, comprising: a laser light source; an optical element; and a transmitting-reflecting member, the image display device which displays an image by forming the image by light which is emitted from the laser light source and making image light after forming the image to be incident on the transmitting-reflecting member, wherein the laser light source is arranged such that there are more S polarization components of the image light which is incident on the transmitting-reflecting member with respect to the transmitting-reflecting member than P polarization components.

According to an embodiment of the present invention, it is possible to improve visibility of a virtual image.

DESCRIPTION OF EMBODIMENTS

Hereinafter, an embodiment will be explained.

Figure 1A:
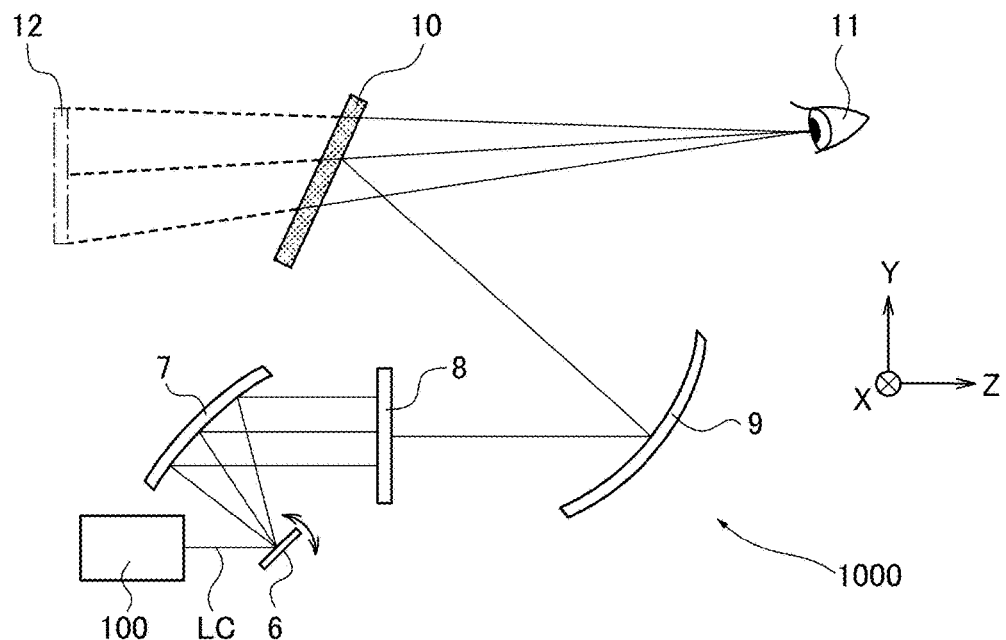
FIGS. 1A to 1C are diagrams explaining an image display device according to one embodiment of the present invention.
Figure 1B:
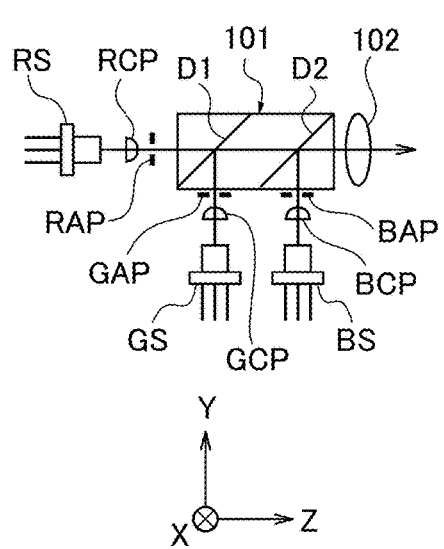
Figure 1C:
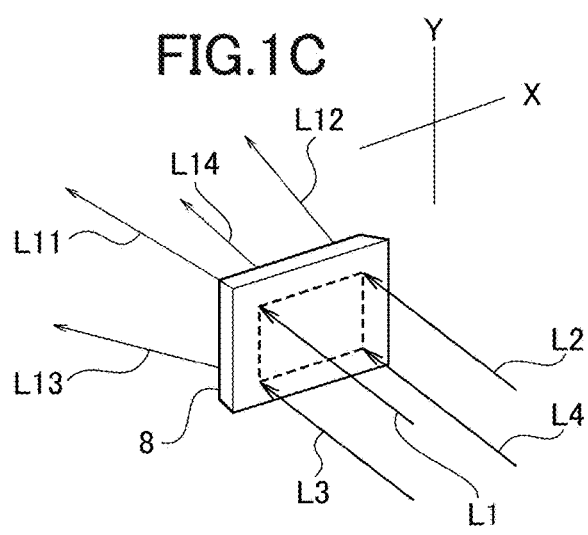

FIGS. 1A to 1C are diagrams explaining an image display device according to one embodiment of the present invention.

An image display device 1000 to be explained with reference to FIGS. 1A to 1C is a head-up display device which displays a two-dimensional color image, and FIG. 1A shows explanatorily the entire device.

The image display device 1000 is mounted in a mobile object such as a vehicle, an aircraft, a ship, or the like, and makes it possible to visually recognize necessary navigation information (for example, information on a moving speed, moving distance, and the like) for driving the mobile object via a transmitting-reflecting member (for example, windshield) provided in the mobile object.

Hereinafter, an explanation will be made by use of an XYZ three-dimensional orthogonal coordinate system in which the mobile object is taken as reference.

Here, a direction of a Z-axis is a front-rear direction as viewed from a driver 11 (hereinafter, also referred to as an observer 11) of a mobile object, and is approximately parallel to a moving direction of the mobile object. A direction of an X-axis is a right-left direction as viewed from the driver 11 of the mobile object. A direction of a Y-axis is an up-down direction as viewed from the driver 11 of the mobile object.

Note that the term transmitting-reflecting member means a member which transmits a part of incidence light, and reflects at least a part of the rest of the incidence light.

Hereinafter, for example, the right-left direction (X-axis direction) as viewed from the driver 11 of the mobile object is also referred to as a horizontal direction. And additionally, for example, arbitrary directions perpendicular to the X-axis such as the front-rear direction (Z-axis direction) and the up-down direction (Y-axis direction) as viewed from the driver 11 of the mobile object, or the like are also referred to as a vertical direction.

In FIG. 1A, a part denoted by reference sign 100 is a light source part, and from the light source part 100, a pixel display beam LC for color image display is emitted in a +Z direction.

The pixel display beam LC is a beam in which beams of three colors of red (hereinafter, referred to as R), green (hereinafter, referred to as G), and blue (hereinafter, referred to as B) are combined as one beam.

That is, the light source part 100 is a structure as shown in FIG. 1B, for example.

In FIG. 1B, each semiconductor laser as a laser light source is denoted by each of reference signs RS, GS, BS, and the semiconductor lasers RS, GS, BS emit laser beams R, G, B, respectively. Here, as each semiconductor laser, a laser diode (LD), which is also referred to as an edge-emitting laser, is used.

Additionally, as one example, each semiconductor laser has an emission surface (edge) of, for example, a rectangular shape, an oval shape, or the like which has a longitudinal direction (direction of a long diameter) and a transverse direction (direction of a short diameter) perpendicular to the longitudinal direction, and each semiconductor laser emits a laser beam in a direction vertical to the emission surface (emission direction) from the emission surface.

As one example, each semiconductor laser is designed such that there are more first polarization components than second polarization components of the first polarization components and the second polarization components in the emission light in which oscillation directions of an electric field are perpendicular to each other. Here, the oscillation direction of the electric field of the first polarization components is parallel to a plane surface parallel to both of the longitudinal direction of the emission surface and the emission direction. The oscillation direction of the electric field of the second polarization components is parallel to a plane surface parallel to both of the transverse direction of the emission surface and the emission direction.

Note that in a case where a light amount of emission light is constant, a ratio of the first polarization components to the emission light is preferably as large as possible, and is most preferably approximately 100% (a ratio of the second polarization components to the emission light is most preferably approximately 0%).

As one example, each semiconductor laser is arranged such that the emission surface is vertical to a YZ-plane.

Specifically, as one example, the semiconductor laser RS is arranged such that the longitudinal direction of the emission surface is parallel to the X-axis, the transverse direction is parallel to the Y-axis, and the emission direction is a +Z direction. In this case, in the semiconductor laser RS, the oscillation direction of the electric field of the first polarization components is vertical to the YZ-plane, and the oscillation direction of electric field of the second polarization components is parallel to the YZ-plane. That is, in the emission light from the semiconductor laser RS, there are more polarization components in which the oscillation direction of the electric field is vertical to the YZ-plane than polarization components in which the oscillation direction of the electric field is parallel to the YZ-plane.

The longitudinal direction of an effective cross-section in a near field of the emission light from the semiconductor laser RS, that is, the longitudinal direction of a near-field pattern, is parallel to the X-axis, and the transverse direction of that is parallel to the Y-axis. And the longitudinal direction of an effective cross-section in a far field of the emission light from the semiconductor laser RS, that is, the longitudinal direction of a far-field pattern, is parallel to the Y-axis, and the transverse direction of that is parallel to the X-axis (See FIG. 9A). That is, the far-field pattern of the emission light from the semiconductor laser RS is vertically long.

Additionally, each of the semiconductor laser GS and the semiconductor laser BS is arranged such that the longitudinal direction of the emission surface is parallel to the X-axis, the transverse direction is parallel to the Z-axis, and the emission direction is a +Y direction. In this case, in each of the semiconductor laser GS and the semiconductor laser BS, the oscillation direction of the electric field of the first polarization components is vertical to the YZ-plane, and the oscillation direction of the electric field of the second polarization components is parallel to the YZ-plane. That is, in the emission light from each of the semiconductor laser GS and the semiconductor laser BS, there are more polarization components in which the oscillation direction of the electric field is vertical to the YZ-plane than polarization components in which the oscillation direction of the electric field is parallel to the YZ-plane. Hereinafter, "there are more polarization components in which the oscillation direction of the electric field is vertical to the YZ-plane than the polarization components in which the oscillation direction of the electric field is parallel to the YZ-plane" is simply described as " there are many polarization components vertical to the YZ-plane" expedientially.

The longitudinal direction of an effective cross-section in a near field of the emission light from each of the semiconductor laser GS and the semiconductor laser BS, that is, the longitudinal direction of a near-field pattern, is parallel to the X-axis, and the transverse direction of that is parallel to the Z-axis. And the longitudinal direction of an effective cross-section in a far field of the emission light from each of the semiconductor laser GS and the semiconductor BS, that is, the longitudinal direction of a far-field pattern, is parallel to the Z-axis, and the transverse direction of that is parallel to the X-axis (See FIG. 9A). That is, the far-field pattern of the emission light from each of the semiconductor laser GS and BS is vertically long.

Figure 9A:
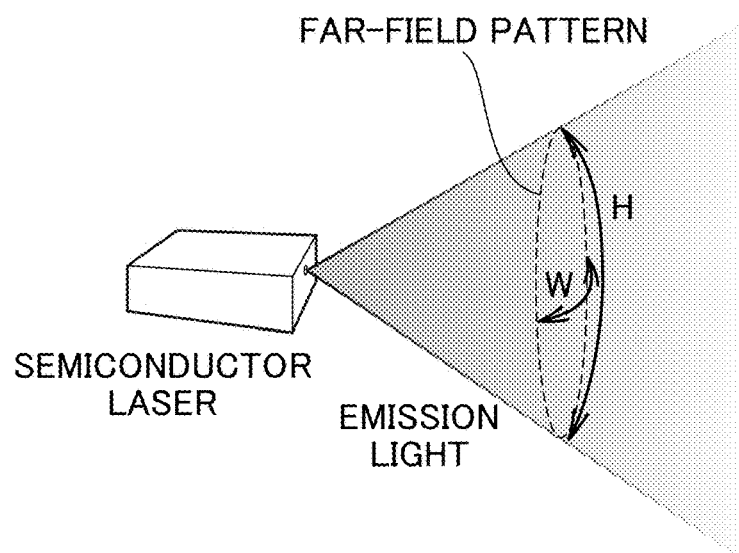
FIGS. 9A and 9B are diagrams each explaining a far-field pattern of emission light from a semiconductor laser.

Note that in FIG. 9A, reference sign W denotes a divergence angle in the X-axis direction in the far-field pattern, and reference sign H denotes a divergence angle in the Y-axis direction or the Z-axis direction in the far-field pattern.

Figure 9B:
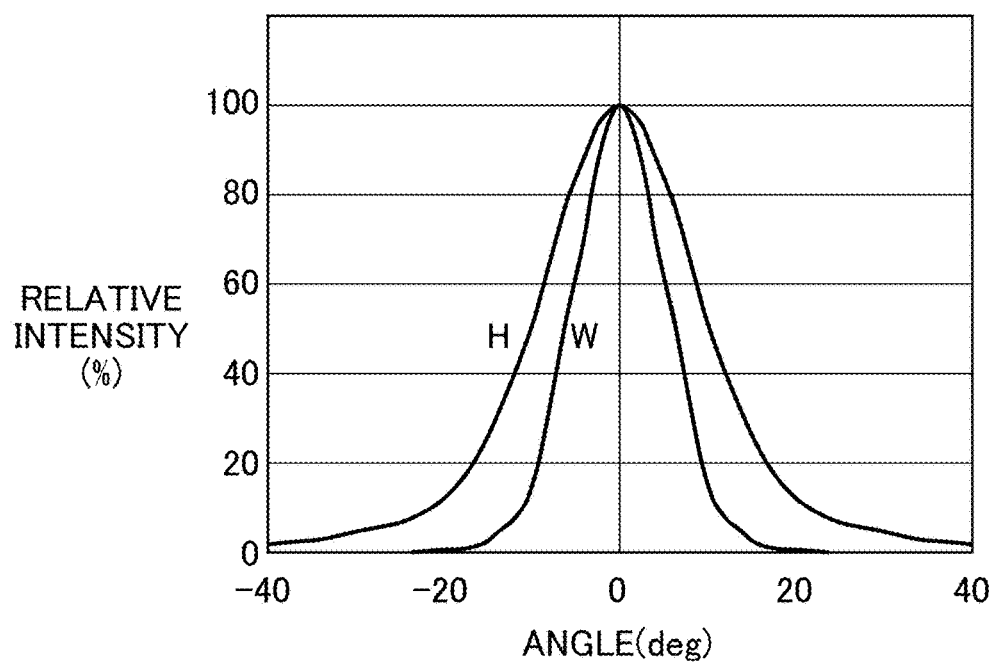

Here, "effective cross-section" means a portion in which a relative intensity is 20% to 80% in a cross-section of a laser beam (See FIG. 9B).

Hereinafter, "the longitudinal direction of the effective cross-section is parallel to the X-axis" is also described as "the effective cross-section is horizontally long", and "the longitudinal direction of the effective cross-section is perpendicular to the X-axis" is also described as "the effective cross-section is vertically long".

Each reference sign RCP, GCP, BCP denotes a coupling lens. Each of the coupling lenses RCP, GCP, BCP suppresses divergence of each of color laser beam fluxes emitted from the semiconductor lasers RS, GS, BS in which there are many polarization components vertical to the YZ-plane and the effective cross-section is vertically long.

The divergence of each of the color laser beam fluxes emitted from the semiconductor lasers RS, GS, BS in which there are many polarization components vertical to the YZ-plane and the effective cross-section is vertically long is suppressed by each of the coupling lenses RCP, GCP, BCP, and each of the color laser beam fluxes in which the divergence has been suppressed by each of the coupling lenses RCP, GCP, BCP is shaped by each of apertures RAP, GAP, BAP.

Each of the shaped color laser beam fluxes in which there are many polarization components vertical to the YZ-plane and the effective cross-section is vertically long is incident to a beam-combining prism 101.

The beam-combining prism 101 has a dichroic film D1 which transmits R color light and reflects G color light, and a dichroic film D2 which transmits R and G color light and reflects B color light.

Here, R color light in which the longitudinal direction of the effective cross-section is parallel to the Y-axis and the transverse direction is parallel to the X-axis (the effective cross-section is vertically long) which has been shaped by the aperture RAP is transmitted through the dichroic film D1 in a +Z direction, and then transmitted through the dichroic film D2 in the +Z direction. That is, the R color light transmitted through the dichroic film D2 is a laser beam in which the effective cross-section is vertically long.

G color light which has been shaped by the aperture GAP is incident to the dichroic film D1 in a state where the longitudinal direction of the effective cross-section is parallel to the Z-axis and the transverse direction is parallel to the X-axis (the effective cross-section is vertically long), reflected by the dichroic film D1 in the +Z direction (an optical path is bent at an angle of 90 degrees), and transmitted through the dichroic film D2 in the +Z direction in a state where the longitudinal direction of the effective cross-section is parallel to the Y-axis and the transverse direction is parallel to the X-axis. That is, the G color light transmitted through the dichroic film D2 is a laser beam in which the effective cross-section is vertically long.

B color light which has been shaped by the aperture BAP is incident to the dichroic film D2 in a state where the longitudinal direction of the effective cross-section is parallel to the Z-axis and the transverse direction is parallel to the X-axis (the effective cross-section is vertically long), and reflected by the dichroic film D2 in the +Z direction (an optical path is bent at an angle of 90 degrees). That is, the B color light reflected by the dichroic film D2 is a laser beam in which the effective cross-section is vertically long.

As a result, the laser beam fluxes of R, G, B colors in each of which there are many polarization components vertical to the YZ-plane and the effective cross-section is vertically long are combined to one beam flux and emitted in the +Z direction from the beam-combining prism 101. In this case, the combined beam flux is also a laser beam flux in which there are many polarization components vertical to the YZ-plane and the effective cross-section is vertically long.

The beam flux emitted from the beam-combining prism 101 is converted to a parallel beam having a predetermined cross-sectional area by a lens 102.

The parallel beam is a pixel display beam LC.

Each of the laser beam fluxes of R, G, B colors constituting the pixel display beam LC is intensity-modulated by an image signal of a two-dimensional color image to be displayed (in accordance with image data). Intensity modulation may be performed by a direct modulation method in which a semiconductor laser is directly modulated, or by an external modulation method in which a laser beam flux emitted from a semiconductor laser is modulated.

That is, emission intensity of the laser beams emitted from the semiconductor lasers RS, GS, BS is modulated by an image signal of each of R, G, B color components, by a not-illustrated driving device.

The image display beam LC emitted from the light source part 100 in which there are many polarization components vertical to the YZ-plane and the effective cross-section is vertically long is incident to a two-dimensional-deflecting device 6 and two-dimensionally deflected.

The two-dimensional-deflecting device 6, in the present embodiment, is structured such that a micro mirror in which two shafts perpendicular to each other are taken as swinging shafts is swung.

That is, specifically, the two-dimensional-deflecting device 6 is a MEMS (Micro Electro Mechanical Systems) as a micro swinging mirror element made in a semiconductor process, or the like.

The two-dimensional-deflecting device 6 is not limited to the above example, but may be a two-dimensional-deflecting device having another structure in which two swinging micro mirrors are combined around one shaft such that swinging directions are perpendicular to each other, or the like, for example.

The thus two-dimensionally deflected pixel display beam LC in which there are many polarization components vertical to the YZ-plane and the effective cross-section is vertically long is incident to a concave mirror 7 and reflected toward a scanned surface element 8.

An optical function of the concave mirror 7 is to reflect the two-dimensionally deflected and incident pixel display beam LC and adjust a direction of the reflected pixel display beam LC to be a constant direction.

That is, the pixel display beam LC reflected by the concave mirror 7 in which there are many polarization components vertical to the YZ-plane and the effective cross-section is vertically long is incident to the scanned surface element 8 while moving parallel in accordance with deflection by the two-dimensional-deflecting device 6, and two-dimensionally scans the scanned surface element 8.

By this two-dimensional scanning, a two-dimensional color image is formed on the scanned surface element 8.

Needless to say, only pixels which are irradiated with the pixel display beam LC at each moment are displayed on the scanned surface element 8 at the moment.

The two-dimensional color image is formed as a mass of pixels which are displayed at each moment by two-dimensional scanning by the pixel display beam LC.

Here, the scanned surface element 8 rotates the longitudinal direction of the effective cross-section of the incident pixel display beam LC in which there are many polarization components vertical to the YZ-plane and the effective cross-section is vertically long at approximately an angle of 90 degrees and emits it. That is, the effective cross-section of the pixel display beam LC is converted to be horizontally long from vertically long by the scanned surface element 8. In other words, the longitudinal direction and the lateral direction of the effective cross-section of the pixel display beam LC are reversed before and after transmitting through the scanned surface element 8.

That is, as described above, on the scanned surface element 8, the two-dimensional color image is formed by the light modulated in accordance with the image data and image light after forming the two-dimensional image in which there are many polarization components vertical to the YZ-plane and the effective cross-section is horizontally long is incident on a concave mirror 9 and reflected.

Although not shown in FIGS. 1A to 1C, the scanned surface element 8 has a later-described microscopic convex lens structure. The concave mirror 9 constitutes a virtual imaging forming optical system.

The virtual imaging forming optical system forms an enlarged virtual image 12 of the two-dimensional color image.

On a side before an imaging forming position of the enlarged virtual image 12, a reflecting surface element 10 is provided, a beam flux forming the enlarged virtual image 12 in which the effective cross-section is horizontally long is reflected to a side of the observer 11 (in the drawing, an eye of the observer is shown).

By this reflected light, the observer 11 can visually recognize the enlarged virtual image 12.

Here, the reflecting surface element 10 is constituted of a flat planar transmitting-reflecting member, and arranged to be vertical to the YZ-plane and inclined to the YZ-plane. In this case, in the image light (incidence light on the reflecting surface element 10) which is incident (here, obliquely incident) on the reflecting surface element 10, there are more S polarization components in which an oscillation direction of an electric field is vertical to an incident surface than P polarization components in which the oscillation direction of the electric field is parallel to the incident surface. Conversely, each semiconductor laser of the light source part 100 is arranged such that there are more S polarization components of the image light which is incident on the reflecting surface element 10 with respect to the reflecting surface element 10 than P polarization components.

Here, "incident surface" means a surface which includes a normal line on a surface in the reflecting surface element 10 on which image light is incident and the image light which is incident on the reflecting surface element 10 (incidence light on the reflecting surface element 10).

As a result, image light in which the effective cross-section is horizontally long and there are more S polarization components than P polarization components is incident on the reflecting surface element 10.

In this case, since the S polarization components of the image light with respect to the reflecting surface element 10 are higher in reflectance than the P polarization components, compared to a case if the S polarization components of the image light are less than the P polarization components, it is possible to increase a light amount of light reflected to the observer 11. Additionally, since the effective cross-section of the light reflected to the observer 11 is horizontally long, a view angle in the horizontal direction of the light becomes wide. As a result, it is possible to improve visibility of a virtual image.

As described above, the scanned surface element 8 has a microscopic convex lens structure.

As later described, the microscopic convex lens structure is a structure in which a plurality of microscopic convex lenses are closely arranged at a pitch which is close to a pixel pitch. Here, as one example, an optical axis of each of the microscopic convex lenses is parallel to the Z-axis. Additionally, as one example, the microscopic convex lenses are two-dimensionally arranged along a predetermined plane surface parallel to an XY-plane.

Each of the microscopic convex lenses has a function of diffusing the pixel display beam LC. Hereinafter, this diffusion function will be explained briefly.

In FIG. 1C, reference signs L1 to L4 denote four pixel display beams which are incident on the scanned surface element 8.

Those four pixel display beams L1 to L4 are pixel display beams which are incident at four corners of a two-dimensional image formed on the scanned surface element 8.

Those four pixel display beams L1 to L4 are converted to beams L11 to L14 when transmitting through the scanned surface element 8.

If a beam flux in which a cross-section surrounded by the pixel display beams L1 to L4 is a vertically-long quadrangle is incident on the scanned surface element 8, the beam flux becomes a divergent beam flux in which the cross-section surrounded by the beams L11 to L14 is a horizontally-long quadrangle. Note that in FIG. 1C, the cross-section surrounded by the pixel display beams L1 to L4 appears to be horizontally long; however, it is actually vertically long.

This function of a microscopic convex lens is a diffusion function.

The divergent beam flux surrounded by the beams L11 to L14 is a result in which the pixel display beams thus converted to the divergent beam flux are temporarily congregated.

To diffuse the pixel display beams is to make a beam flux reflected by the reflecting surface element 10 to irradiate a wide region in the vicinity of eyes of the observer 11.

In a case where there is no diffusion function, the beam flux reflected by the reflecting surface element 10 irradiates only a narrow region in the vicinity of the eyes of the observer 11.

Therefore, when the observer 11 moves his/her head and a position of the eyes is deviated from the above narrow region, it is not possible for the observer 11 to visually recognize the enlarged virtual image 12.

As described above, by diffusing the pixel display beam LC, a beam flux reflected by the reflecting surface element 10 irradiates the wide region in the vicinity of the eyes of the observer 11.

Therefore, even if the observer 11 moves his/her head slightly, it is possible to visually recognize the enlarged virtual image 12 reliably.

As described above, in the present embodiment, the pixel display beam LC incident on the scanned surface element 8 is the parallel beam; however, after transmitting the scanned surface element 8, it becomes a divergent beam.

Here, in the microscopic convex lens, a refractive index (diffusion power) regarding the X-axis direction is larger than a refractive index (diffusion power) regarding the Y-axis direction. That is, in the microscopic convex lens, a curvature regarding the X-axis direction is larger than a curvature regarding the Y-axis direction. And a transverse direction (direction of a short diameter) of an effective cross-section of the vertically-long pixel display beam LC incident on the microscopic convex lens coincides with the X-axis direction.

In this case, the microscopic convex lens converts the effective cross-section of the incident pixel display beam LC from vertically long to horizontally long and emits it. That is, the microscopic convex lens rotates a longitudinal direction (direction of a long diameter) of the effective cross-section of the pixel display beam LC at approximately an angle of 90 degrees.

Then, the pixel display beam LC which has been emitted from the scanned surface element 8, and enlarged and reflected by the concave mirror 9 is incident on the reflecting surface element 10 in a state where there are more S polarization components with respect to the reflecting surface element 10 than P polarization components and the effective cross-section is horizontally long.

As a result, on the reflecting surface element 10, a laser beam flux is incident in which a light amount of the pixel display beam LC emitted from the light source part 100 is almost maintained, there are more S polarization components than P polarization components, and the effective cross-section is horizontally long.

Here, reflectance of the S polarization components of the laser beam flux incident on the reflecting surface element 10 is larger than reflectance of the P polarization components.

In this case, compared to a case where a light amount of a laser beam flux incident on the reflecting surface element 10 is the same and there are more P polarization components than S polarization components, a light amount of the laser beam flux reflected by the reflecting surface element 10 increases, and visibility of a virtual image via the reflecting surface element 10 is improved.

Incidentally, in general, since a virtual image to be displayed in a visually-displayable manner via a transmitting-reflecting member by a head-up display is horizontally long (original image is also horizontally long), a field angle necessary to form each pixel of an original image of the virtual image is larger in a horizontal direction than in a vertical direction. Additionally, since an observer observes a virtual image from not only a front direction but also an obliquely-horizontal direction, it is necessary to ensure a view angle in the horizontal direction than in the vertical direction.

Accordingly, in the scanned surface element 8, a divergence angle in the X-axis direction is designed to be larger than a divergence angle in the Y-axis direction, which makes it possible to diffuse light in a range of minimum requirement to satisfy a required field angle of the image display device 1000, and improve use efficiency of light, and it is possible to improve brightness of image light incident on the eyes of the observer.

In the embodiment of the present invention, the scanned surface element 8 has a microscopic convex lens structure in which a plurality of microscopic convex lenses which diffuse the pixel display beam LC are closely arranged at a pitch close to a pixel pitch.

The microscopic convex lens is larger than a beam diameter of the pixel display beam LC.

Making the microscopic convex lens larger than the beam diameter of the pixel display beam LC is for coherent noise reduction. Hereinafter, explanation will be made with reference to FIGS. 2A to 3C.

Figure 2A:
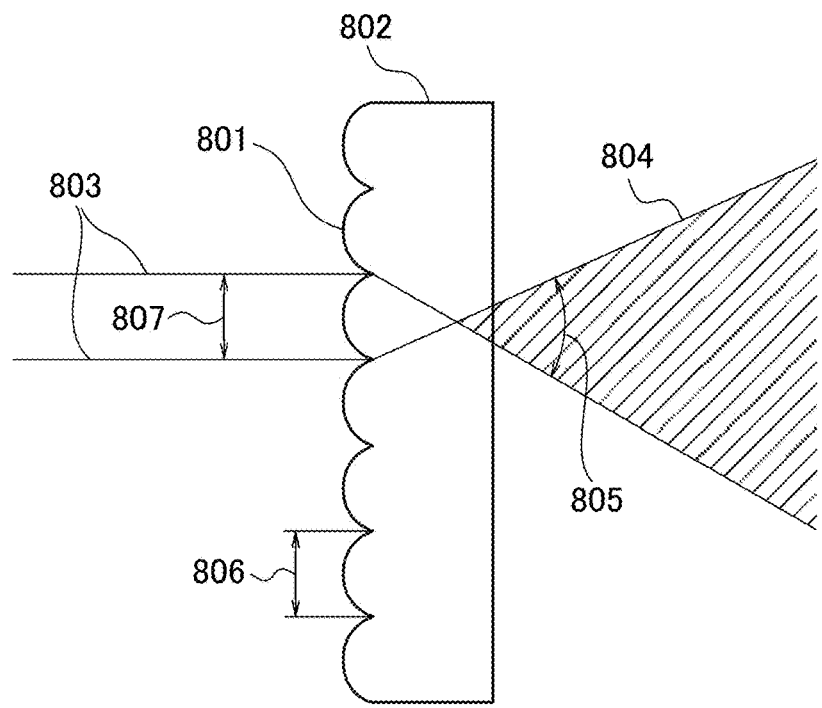
FIGS. 2A and 2B are diagrams explaining diffusion by a microscopic convex lens and an occurrence of coherent noise.

In FIG. 2A, reference sign 802 denotes a scanned surface element.

The scanned surface element 802 has a microscopic convex lens structure in which a microscopic convex lens 801 is arranged A beam flux diameter 807 of the pixel display beam denoted by reference sign 803 is smaller than the size of the microscopic convex lens 801.

That is, a size 806 of the microscopic convex lens 801 is larger than the beam flux diameter 807.

Note that in the present embodiment, the pixel display beam 803 is a laser beam flux which has a light intensity distribution in the form of Gaussian distribution around the center of the beam flux.

Therefore, the beam flux diameter 807 is a distance in a radial direction of the beam flux in which light intensity falls to "$1/e^2$" in the light intensity distribution.

In FIG. 2A, the beam flux diameter 807 is shown to be equal to the size 806 of the microscopic convex lens 801; however, the beam flux diameter 807 does not need to be equal to the size 806 of the microscopic convex lens 801.

The beam flux 807 only needs not to exceed the size 806 of the microscopic convex lens 801.

In FIG. 2A, an entire pixel display beam 803 is incident on one microscopic convex lens 801, and converted to a diffusion beam flux 804 having a diffusion angle 805.

Hereinafter, a divergence angle is also referred to as a diffusion angle.

In a state of FIG. 2A, there is one diffusion beam flux 804 and there is no interfering beam flux, and therefore, coherent noise (speckle noise) is not generated.

Note that a size of the divergence angle 805 can be suitably set by a shape of the microscopic convex lens 801.

Figure 2B:
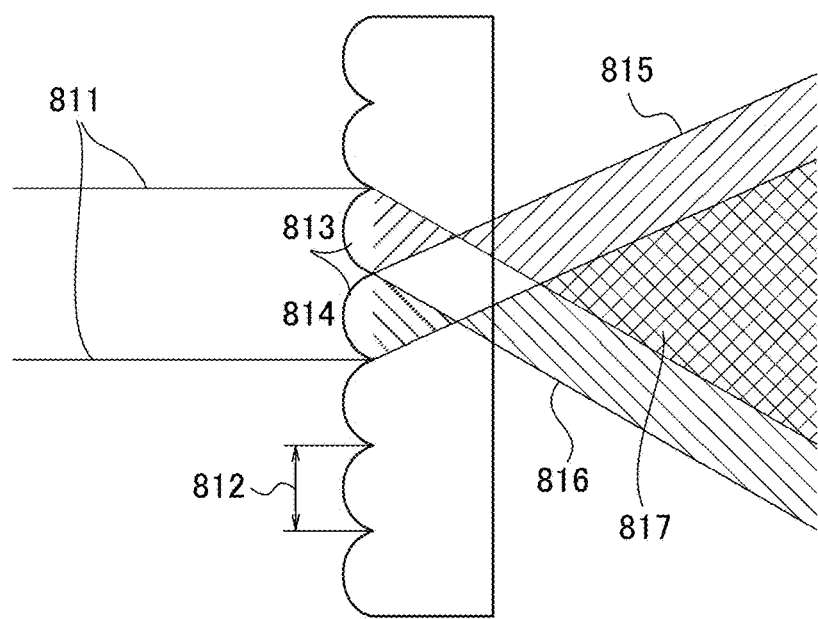

In FIG. 2B, a beam flux diameter of a pixel display beam 811 is twice as large as an arrangement pitch 812 of a microscopic convex lens, and incident on two adjacent microscopic convex lenses 813, 814.

In this case, the pixel display beam 811 is incident on the two adjacent microscopic convex lenses 813, 814 and diffused as two divergence beam fluxes 815, 816 by the two adjacent microscopic convex lenses 813, 814.

The two divergence beam fluxes 815, 816 overlap with each other in a region 817, interfere with each other in this region, and coherent noise is generated.

Figure 3A:
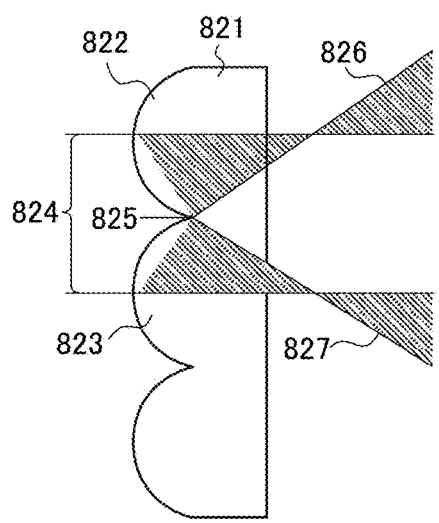
FIGS. 3A to 3C are diagrams explaining coherent noise removal.

In FIG. 3A, a state where a pixel display beam 824 is incident on two adjacent microscopic convex lenses 822, 823 of a scanned surface element 821 is shown.

A beam flux diameter of the pixel display beam 824 is equal to a size of the microscopic convex lens 822, and the like.

In this case, a beam portion incident on the microscopic convex lens 822 becomes a divergence beam flux 826, a beam portion incident on the microscopic convex lens 823 becomes a divergence beam flux 827, and they are diffused.

Since the divergence beam fluxes 826, 827 are diffused in directions distant from each other, they do not overlap with each other, and therefore, coherent noise is generated in this state.

That is, coherent noise due to the beam fluxes diffused by the microscopic convex lenses is not generated when a beam diameter of the pixel display beam 824 is set to be smaller than or equal to the size of the microscopic convex lens 822.

A specific numerical example of a diameter of a microscopic convex lens and a beam diameter of a pixel display beam incident on a scanned surface element is described.

It is easy to set the beam diameter of the pixel display beam to approximately 150 μm, for example.

In this case, a size of the microscopic convex lens constituting the microscopic convex lens structure only needs to be set to the size which is equal to or larger than the above 150 μm, for example, 160 μm, 200 μm, or the like.

In the scanned surface element 821 shown in FIG. 3A, the adjacent microscopic convex lenses 822, 823, and so on are arranged without any space.

Therefore, a width of a border portion 825 of a lens surface between the adjacent microscopic convex lenses 822, 823 (hereinafter, also referred to as a border width) is 0 (zero).

Accordingly, only divergence beam fluxes 826, 827 are generated from the pixel display beam 824 incident on the adjacent microscopic convex lenses 822, 823 as shown in FIG. 3A.

However, in a microscopic convex lens structure actually formed, there is no case where a border width between adjacent microscopic convex lenses is 0.

Figure 3B:
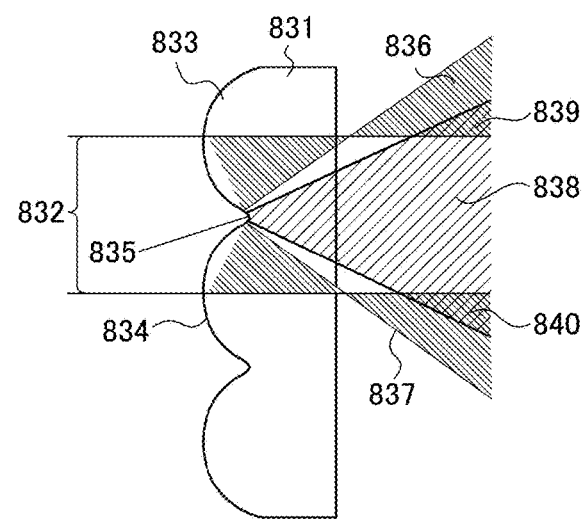

That is, as a scanned surface element 831 shown in FIG. 3B, in the microscopic convex lens structure actually formed, a width of a border portion 835 between adjacent microscopic convex lenses 833, 834 is not 0.

In the border portion 835 between the adjacent microscopic convex lenses 833, 834, curved surfaces are smoothly continued microscopically, and in the border portion 835, a curved surface is formed.

The curved surface thus formed in the border portion 835, when a pixel display beam 832 is incident on this portion, functions as a micro lens surface with respect to a portion of incidence light.

Therefore, from the pixel display beam 832 which is incident on the adjacent microscopic convex lenses 833, 834, not only the divergent beam fluxes 836, 837 but also a divergent beam flux 838 are also generated.

The divergent beam flux 838 is generated by a lens function of the curved surface of the border portion 835, overlaps and interferes with the divergent beam fluxes 836, 837 in regions 839, 840, and coherent noise is generated.

Figure 3C:
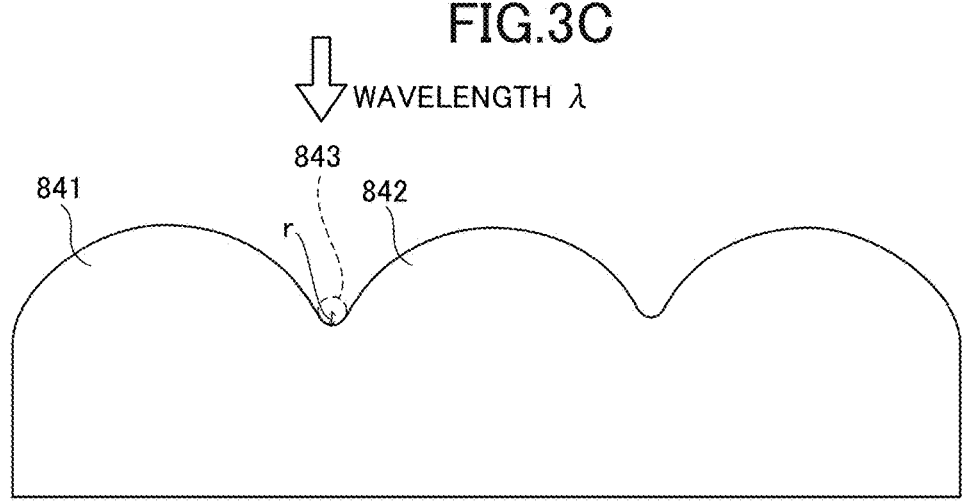

FIG. 3C is a diagram which explains reduction or prevention of coherent noise in the microscopic convex lens structure.

In the microscopic convex lens structure, a curved surface of a border portion 843 between adjacent microscopic convex lenses 841, 842 in which lens surfaces are gently continued, itself, forms a micro lens surface.

A curvature radius of the curved surface of the border portion 843 is denoted by r as shown in the drawing.

Here, for simplicity of explanation, a pixel display beam incident on the microscopic convex lens structure is taken as a single-color laser beam flux of a wavelength $\lambda$.

In a case where the curvature radius r of the border portion 843 is larger than the wavelength $\lambda$ of the pixel display beam ($r > \lambda$), the curved surface of the curvature radius r serves a lens function for the incident pixel display beam.

Therefore, in this case, a beam component passing through the border portion 843 is diverged, overlaps and interferes with beam fluxes diffused by the microscopic convex lenses 841, 842, and coherent noise is generated.

On the other hand, when the curvature radius r of the border portion 843 is smaller than the wavelength $\lambda$ of the pixel display beam, the border portion 843 becomes a sub-wavelength structure for the pixel display beam.

As is well known, the sub-wavelength structure does not serve the lens function for light of a wavelength which is larger than in the sub-wavelength structure.

Therefore, the border portion 843 having the curvature radius r smaller than the wavelength $\lambda$ does not function as a lens, transmits the pixel display beam straightforwardly, and does not diverge it.

Therefore, a beam portion transmitted through the border portion 843 straightforwardly and the divergent beam fluxes diffused by the microscopic convex lenses 841, 842 do not overlap with each other, and coherent noise due to interference is not generated.

That is, magnitude relationships of the beam diameter d of the pixel display beam, the wavelength $\lambda$, the size D of the microscopic convex lens, and the curvature radius r of the surface forming the border portion are preferably defined as follows.

$$D > d, \lambda > r$$

In a case where a two-dimensional virtual image to be displayed is a monochrome image, a pixel display beam is formed by single-color coherent light of the wavelength $\lambda$.

Therefore, in this case, by setting the above-described D, d, r, and $\lambda$ to satisfy the magnitude relationships, it is possible to suppress coherent noise.

As in the present embodiment, in a case of displaying a two-dimensional color image (virtual image), the pixel display beam LC is a beam in which beams of three colors of R, G, B are combined.

When wavelengths of those three beams are $\lambda R$ (=640 nm), $\lambda G$ (=510 nm), and $\lambda B$ (=445 nm), a magnitude relationship among those is expressed by $\lambda R > \lambda G > \lambda B$.

Therefore, in terms of prevention of coherent noise, the curvature radius r of the surface forming the border portion is smaller than the shortest wavelength $\lambda B$, and preferably 400 nm.

However, if the curvature radius r is set to be smaller (for example, 600 nm) than the longest wavelength $\lambda R$, it is possible to prevent coherent noise due to light of an R component of the image display beam.

That is, it is possible to effectively reduce coherent noise.

If r (for example, 500 nm)$<\lambda G$, it is possible to prevent coherent noise due to light of the R component and a G component of the image display beam.

In a case where the pixel display beam LC is the beam in which the beams of the three colors of R, G, B are combined, coherent noise is independently generated with respect to components of the three colors.

All of coherent noises of those independent beams of the three colors of R, G, B become visible coherent noise.

Therefore, with absence of one of the coherent noises of the three colors, the visible coherent noise is improved significantly, which contributes to improvement in image quality of an observation image.

Therefore, an effect of prevention of coherent noise is obtained even only by the R component of the longest wavelength of the three colors, and a reduction effect is improved subsequently in the order of the G component and a B component.

Accordingly, if the curvature radius r is set to be smaller (for example, 600 nm) than the longest wavelength $\lambda R$, it is possible to obtain a certain effect in terms of reduction of the coherent noise.

Although noise intensity changes due to a wavelength, a beam diameter, a multi/single mode, or the like, an order of visibility of coherent noise is generally expressed by R$\approx$G>B.

That is, light of the wavelength $\lambda B$ is low in spectral sensitivity of human eyes, and coherent noise is difficult to be noticeable.

Therefore, if the curvature radius r is set to be smaller (for example, 500 nm) than the wavelength $\lambda G$, it is possible to reduce coherent noise due to light of the wavelengths $\lambda R$, $\lambda G$ which are comparatively high in visibility.

Even if the coherent noise due to the light of the wavelength $\lambda B$ which is low in spectral sensitivity is generated, it is nearly unnoticeable.

Needless to say, if the curvature radius r is set to be smaller (for example, 400 nm) than the wavelength $\lambda B$, as described above, it is further effective to reduce coherent noise.

The size of each of the plurality of microscopic convex lenses constituting the microscopic convex lens structure is in the order of 100 μm as described above, and this can be achieved as a normal microlens.

Additionally, the microscopic convex lens structure in which a plurality of microscopic convex lenses are arranged can be achieved as a microlens array.

Therefore, hereinafter, the microscopic convex lens is also referred to as a microlens, and the microscopic convex lens structure is also referred to as a microlens array.

Generally, the microlens array is made such that a mold having a transfer surface of a lens surface array of the microlens array is made, and then by use of the mold, the surface of the mold is transferred to a resin material.

A method of forming the transfer surface in the mold by use of cutting, photolithography, or the like is known.

Additionally, transferring the transfer surface to the resin material can be performed by injection molding, for example.

Making a curvature radius in a border portion between adjacent microlenses smaller can be achieved by making a border width smaller.

A small border width can be achieved by sharpening a border portion formed by a surface between the adjacent microlenses.

In the mold for the microlens array, as a method of making the size of the border width between the adjacent microlenses smaller to the order of a wavelength, various methods are known.

For example, in Japanese Patent Number 4200223, a method is disclosed in which a curvature radius of each microlens is increased by anisotropic etching and ion processing, and a non-lens portion of a border portion is removed.

Additionally, in Japanese Patent Number 5010445, by use of isotropic dry etching, a method is disclosed in which a flat surface between adjacent microlenses is removed.

For example, by use of those known methods, it is possible to make a sufficiently small microlens array having a curvature radius of a surface which forms a border portion between adjacent microlenses.

That is, the scanned surface element described above can be constituted as a microlens array having a structure in which a plurality of microlenses are adjacently arranged to each other.

By forming a microlens array such that a curvature radius r of a surface which forms a border portion between adjacent microlenses is smaller than 640 nm, it is possible to prevent coherent noise of light of an R component.

Additionally, if a microlens array is formed such that the curvature radius r is smaller than 510 nm, it is possible to prevent coherent noise by light of an R component and a G component.

If a microlens array is formed such that the curvature radius r of a surface which forms a border portion between adjacent microlenses is smaller than 445 nm, it is possible to prevent coherent noise of light of R, G, B components.

In the above, the image display device (head-up display device) shown in FIG. 1 has been explained.

The concave mirror 7 shown in FIG. 1 has a function of reflecting a pixel display beam LC which is two-dimensionally deflected and incident and adjusting a direction of the reflected pixel display beam CL to a certain direction.

That is, the concave mirror 7 functions as a deflection range-regulating device which adjusts a deflection range of the two-dimensionally deflected pixel display beam and regulates a scan range of the scanned surface element.

Such a deflection range-regulating device can be omitted in a case where a deflection angle of the pixel display beam two-dimensionally deflected by the two-dimensional-deflecting device 6 is not so large.

Next, an example of arrangement of a plurality of microscopic convex lenses (microleses) in a microscopic convex lens structure (microlens structure) will be explained.

Conditions for the microlens array and the microlenses are described above.

That is, a plurality of microscopic convex lenses larger than a beam diameter of a pixel display beam which are closely arranged at a pitch close to a pixel pitch constitute a microscopic convex lens structure.

Figure 4A:
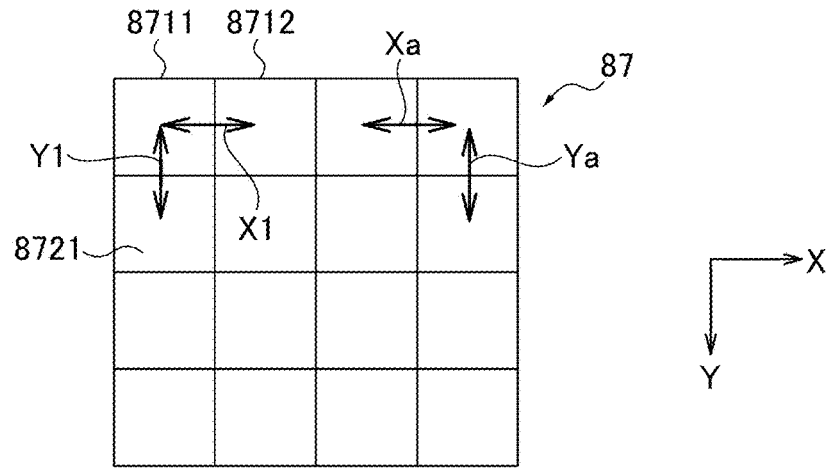
FIGS. 4A to 4C are diagrams explaining three examples of microscopic convex lens arrangement.
Figure 4B:
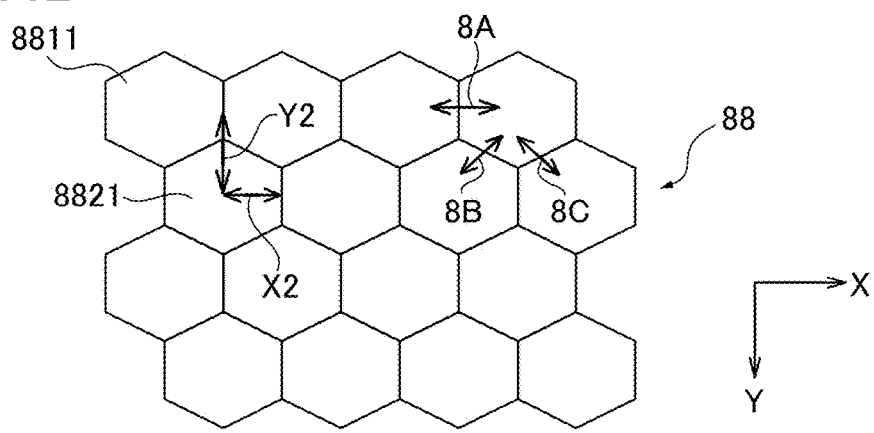
Figure 4C:
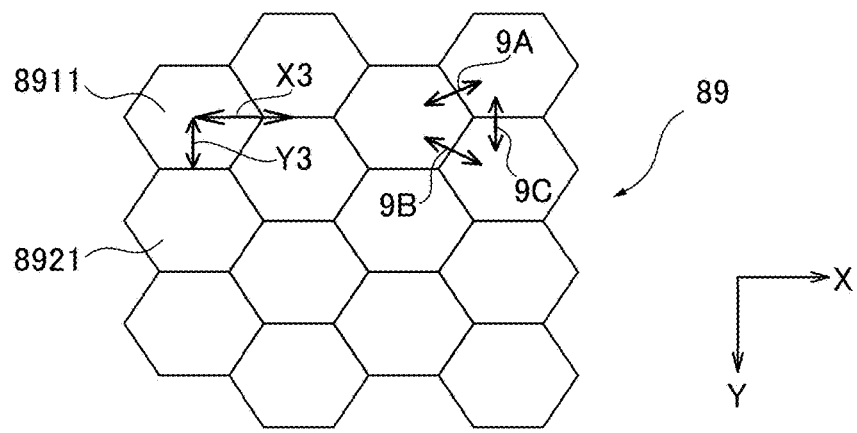

Three specific examples of the microlens array which satisfies such conditions are shown in FIGS. 4A to 4C.

In FIG. 4A, a microlens array 871 is shown in which square-shaped microlenses 8711, 8712, and so on are arranged in a square matrix manner.

The number of pixels of a two-dimensional image (virtual image) displayed in a head-up display device is determined by an arrangement period of the microlenses in the microlens array.

In a case of the arrangement shown in FIG. 4A, a distance between centers of the microlenses 8711, 8712 which are adjacently arranged in the X-axis direction is taken as X1.

In addition, in the drawing, a distance between the centers of the microlenses 8711, 8721 which are adjacently arranged in the Y-axis direction is taken as Y1.

Those X1 and Y1 can be taken as an effective size of one pixel.

Hereinafter, the effective size of the one pixel is also referred to as an effective pitch of one pixel, or an effective pixel pitch.

In FIG. 4B, a microlens array 88 is shown in which regular hexagon-shaped micro lenses 8811, 8821, and so on are densely arranged.

In the arrangement of the microlenses of this case, the arranged microlenses 8811, and so on do not have sides parallel to the X-axis direction.

That is, upper sides and lower sides of the microlenses arranged in the X-axis direction are in a zig-zag manner, and therefore, such an arrangement is referred to as a zig-zag type arrangement.

In FIG. 4C, a microlens array 89 is shown in which regular hexagon-shaped micro lenses 8911, 8921, and so on are densely arranged.

In the arrangement of the microlenses of this case, the arranged microlenses 8911, and so on have sides parallel to the X-axis direction. The arrangement of this case is referred to as an armchair type arrangement.

The zig-zag type arrangement and the armchair type arrangement are each referred to as a honeycomb type arrangement.

The armchair type arrangement shown in FIG. 4C is an arrangement in which the zig-zag type arrangement shown in FIG. 4B is rotated at an angle of 90 degrees.

In the zig-zag type arrangement, in the arrangement of the microlenses, X2 shown in the drawing can be taken an effective pixel pitch in the X-axis direction, and Y2 shown in the drawing can be taken as an effective pixel pitch in the Y-axis direction.

In the armchair type arrangement, X3 shown in the drawing can be taken as an effective pixel pitch in the X-axis direction, and Y3 shown in the drawing can be taken as an effective pixel pitch is the Y-axis direction.

In FIG. 4B, the effective pixel pitch Y2 is a distance between a center of the microlens 8821 and a midpoint of a side on the right of the microlens 8811.

In FIG. 4C, the effective pixel pitch X3 is a distance between a midpoint of two mutually-contacting sides of two mutually-contacting microlenses adjacently arranged on the right side of the microlens 8911 and a center of the microlens 8911.

In the zig-zag type arrangement, the effective pixel pitch X2 in the X-axis direction is small, and therefore, it is possible to improve resolution in the X-axis direction in an image display.

Additionally, in the armchair type arrangement, it is possible to improve resolution in the Y-axis direction.

By thus arranging the microlenses in a honeycomb type, it is possible to effectively express a pixel smaller than an actual lens diameter, and improve the number of effective pixels.

As described above, in the microscopic convex lens structure (microlens array) of the scanned surface element, the border portion between the adjacent microlenses has the curvature radius r.

The curvature radius r is smaller than the wavelength $\lambda R$ of the R component of the pixel display beam, for example.

Therefore, as described above, coherent noise due to interference of coherent light of the R component is prevented.

However, if the curvature radius r is larger than the wavelength $\lambda G$ of the light of the G component and the wavelength $\lambda B$ of the light of the B component of the pixel display beam, the light is diffused and interferes with each other.

Therefore, coherent noise is generated by this interference.

In this case, if the arrangement of the microlenses is the arrangement in the square matrix manner shown in FIG. 4A, divergence (diffusion) in the border portion is generated in two directions of a Xa direction and a Ya direction in the drawing, and each causes coherent noise.

On the other hand, if the arrangement of the microlenses is the arrangement shown in FIG. 4B, divergence in the border portion is generated in three directions of an 8A direction, an 8B direction, and an 8C direction. Additionally, if the arrangement of the microlenses is the arrangement shown in FIG. 4C, divergence in the border portion is generated in three directions of a 9A direction, a 9B direction, and a 9C direction.

That is, in a square matrix arrangement, the divergence in the border portion is generated in the two directions, and in a honeycomb arrangement, the divergence in the border portion is generated in the three directions.

Therefore, in the square matrix arrangement, coherent noise is generated two-directionally, and in the honeycomb arrangement, the coherent noise is generated in three-directionally.

That is, in the square matrix arrangement, coherent noise to be generated is diffused in the two directions, and in the honeycomb arrangement, coherent noise to be generated is diffused in the three directions.

Maximum intensity of coherent light which generates coherent noise is constant.

Therefore, as the number of directions to be diffused is large, contrast of the coherent noise to be generated is weakened, and it is difficult to be visually recognized (difficult to be noticeable).

Therefore, in a case where generation of coherent noise due to a component of a wavelength smaller than the curvature radius r of the border portion is allowed, the arrangement of the microlenses is preferably the honeycomb arrangement.

Note that in a case where the border width is larger than the wavelength λR, coherent noise due to coherent light of the R component is also generated.

However, the border width of the lens surface between the adjacent microscopic convex lenses is minute, light energy of coherent light incident on a portion of a minute border width is small.

Therefore, light energy which generates coherent noise is not large, either.

Accordingly, in a case of the honeycomb arrangement, even if coherent noise is generated, as described above, contrast is weakened by being diffused in the three directions.

Therefore, visibility of coherent noise is effectively reduced.

As explained with reference to FIG. 1A, the virtual imaging forming optical system which forms the two-dimensional enlarged virtual image 12 is constituted of the concave mirror 9.

That is, the enlarged virtual image 12 is a mass of pixel images formed by the concave mirror 9.

When a microlens as a microscopic convex lens is allowed to have an anamorphic function, it is possible to make a diffusion function of the microscopic lens different in directions perpendicular to each other.

Figure 6A:
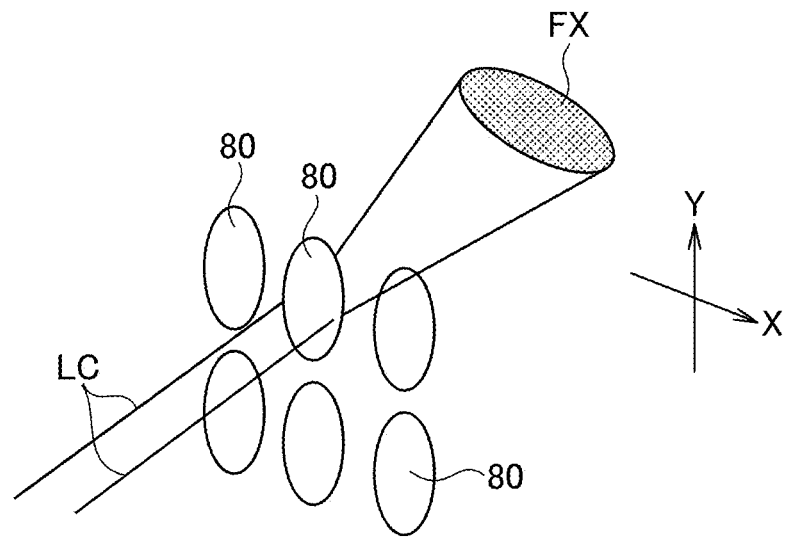
FIGS. 6A and 6B are diagrams explaining anamorphic microscopic convex lenses.
Figure 6B:
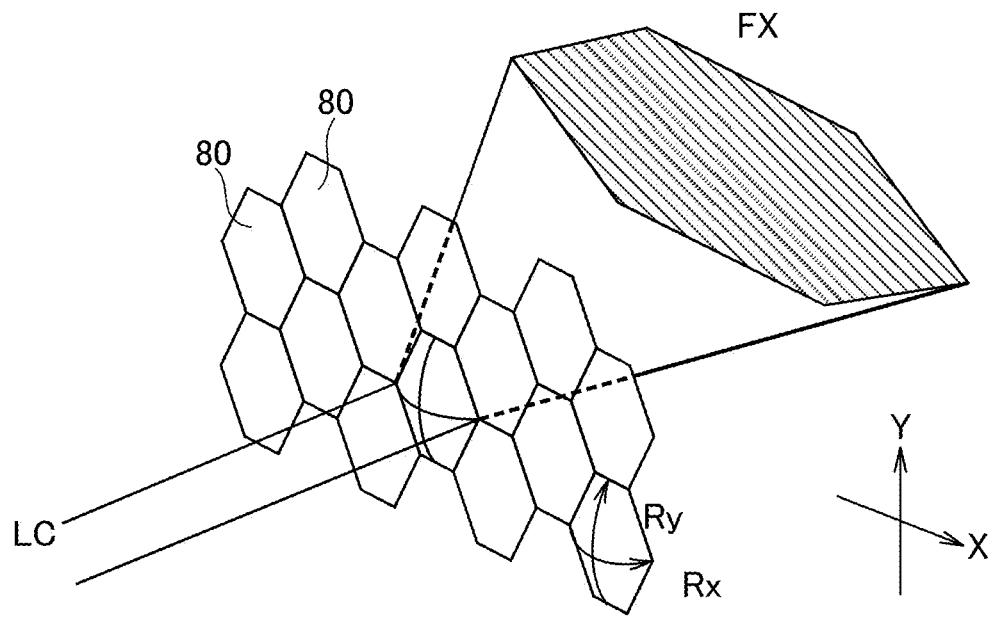

With reference to FIGS. 6A and 6B, in FIGS. 6A and 6B, reference sign 80 denotes each of microlenses (microscopic convex lenses) densely formed in the scanned surface element 8, and FIGS. 6A and 6B are explanatory diagrams.

In an example of FIG. 6A, the microscopic convex lenses 80 have vertically-long oval shapes, and are arranged in a matrix manner arrangement.

In an example of FIG. 6B, the microscopic convex lenses 80 have vertically-long hexagonal shapes having sides parallel to the X-axis direction, and are arranged in the armchair type arrangement.

In each microscopic convex lens 80 shown in FIG. 6B, curvature radii of a lens surface are different in the X-axis direction and the Y-axis direction, and a curvature radius Rx in the X-axis direction is smaller than a curvature radius Ry in the Y-axis direction. That is, in each microscopic convex lens 80 shown in FIG. 6B, a curvature in the X-axis direction is larger than a curvature in the Y-axis direction.

Therefore, power (diffusion power) in the X-axis direction of each microscopic convex lens 80 shown in FIG. 6B is larger than power (diffusion power) in the Y-axis direction.

Additionally, since both of the X-axis direction and the Y-axis direction of the lens surface are allowed to have curvatures, as shown in FIG. 6B, it is possible to form the microscopic convex lenses into hexagonal shapes, and weaken visibility of coherent noise as described above.

In each of FIGS. 6A and 6B, a case where a pixel display beam LC is incident on one microscopic convex lens 80 is shown. In each of FIGS. 6A and 6B, a width in the Y-axis direction of each microscopic convex lens 80 is longer than a width in the X-axis direction of each microscopic convex lens 80.

Additionally, as shown in FIG. 6A, a beam diameter of the pixel display beam LC has an oval shape which is vertically long in the Y-axis direction, and a beam flux diameter in the Y-axis direction is smaller than a diameter in the Y-axis direction of the microscopic convex lens 80.

Accordingly, the pixel display beam LC can be incident without crossing a lens border, and a shape of an effective cross-section of a divergence beam flux to be emitted becomes an oval shape which is long (horizontally long) in the X-axis direction.

Regardless of the length in the Y-axis direction and the length in the X-axis direction of the microscopic convex lens, if the curvature in the X-axis direction is larger than the curvature in the Y-axis direction, a cross-section FX (effective cross-section) of a beam flux of the divergence beam to be emitted from each microscopic convex lens becomes longer in the X-axis direction than in the Y-axis direction. That is, it is horizontally long.

The above-explained head-up display device, for example, can be used as an in-vehicle one for an automobile, or the like, and in this case, the X-axis direction is a right-left direction as viewed from a driver's seat, and the Y-axis direction is an up-down direction.

The reflecting surface element 10 in this case is a windshield of the automobile.

In this case, as the virtual image 12, for example, a navigation image can be displayed in front of the windshield, and a driver as the observer 11 can observe the image without removing a driver's gaze from the front of the windshield while sitting on the driver's seat.

In such a case, as described above, the displayed enlarged virtual image is an image which is horizontally long as viewed from the driver, that is, an image formed on a microlens and the enlarged virtual image are preferably images in which a field angle is large in the X-axis direction, generally.

Additionally, as described above, also in a case where the driver as the observer looks at a display image from directions diagonally right and left, so as to recognize the display, a large view angle is required in a horizontal direction compared to in a vertical direction.

Therefore, in a longitudinal direction (X-axis direction) of the enlarged virtual image, a large diffusion angle (anisotropic diffusion) is required compared to in a transverse direction (Y-axis direction).

Therefore, it is preferable that the microscopic convex lens of the scanned surface element be an anamorphic lens in which a curvature is larger in the longitudinal direction of the image formed on the microlens or the enlarged virtual image than in the transverse direction, and a diffusion angle which diffuses a pixel display beam be larger in a horizontal direction of a two-dimensional image than in a vertical direction.

Thus, it is possible to diffuse light in a requisite minimum range which satisfies a required angle of the head-up display device, improve use efficiency of light, and improve brightness of a display image.

Needless to say, it is possible not only in a case of the above anisotropic diffusion but also in a case of an isotropic diffusion in which diffusion angles are equal in the vertical direction and the horizontal direction.

However, in a case of the head-up display device used for the in-vehicle one for the automobile, or the like, there are fewer cases where a driver observes a display image from a position in the up-down direction with respect to the display image.

Therefore, in such a case, as described above, in terms of use efficiency of light, it is preferable that the diffusion angle which diffuses the pixel display beam be larger in the horizontal direction of the two-dimensional image than in the vertical direction.

It is conventionally known that a lens surface of the microscopic convex lens (microlens) is formed as an aspherical surface.

Although the above-described anamorphic lens surface is also the aspherical surface, it is possible to form a lens surface of the microscopic convex lens as a more general aspherical surface, and it is also possible to perform aberration correction.

In addition, it is possible to reduce unevenness in intensity of diffusion by aberration correction.

Each microscopic convex lens in the microscopic convex lens structure (microlens array) shown in FIGS. 4A to 4C has a square shape or a regular hexagonal shape.

The shape of the microscopic convex lens does not need to be such a regular polygon, and each shape of the microlenses shown in FIGS. 4A to 4C may be extended in one direction.

In this case, the square shape becomes a rectangular shape, and the regular hexagonal shape becomes an elongated deformed hexagonal shape.

In the arrangements shown in FIGS. 4A to 4C, the effective pixel pitches of the microscopic convex lens structures in the X-axis direction are X1 to X3, and those in the Y-axis direction are Y1 to Y3.

Each of the effective pixel pitches in the X-axis direction and each of the effective pixel pitches in the Y-axis direction which are thus defined are generally SX and SY, respectively, and a ratio of SY to SX is referred to as an aspect ratio, and SY/SX expresses a value of the aspect ratio.

In a case of FIG. 4A, a value of the aspect ratio is expressed by Y1/X1, and X1=Y1, and therefore, a value of the aspect ratio is 1.

In a case of FIG. 4B, a value of the aspect ratio is expressed by Y2/X2, and Y2>X2, and therefore, a value of the aspect ratio is larger than 1.

In a case of FIG. 4C, a value of the aspect ratio is expressed by Y3/X3, and Y3<X3, and therefore, a value of the aspect ratio is smaller than 1.

In microscopic convex lens structures of microlens arrays 91 to 95 shown in FIGS. 5A to 5E, similarly to the cases of FIGS. 4A to 4C, effective pixel pitches are defined as follows.

That is, effective pixel pitches in the X-axis direction and those in the Y-axis direction are "X11, Y11", "X12, Y12", and "X13, Y13" in FIGS. 5A to 5E.

Figure 5A:
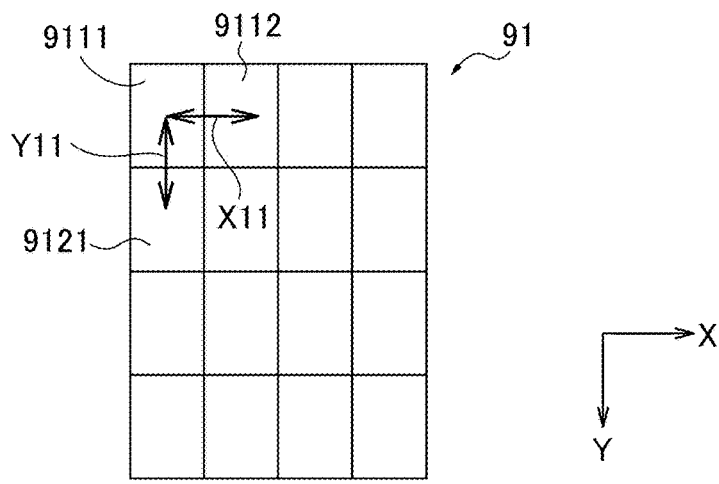
FIGS. 5A to 5E are diagrams explaining five other examples of microscopic convex lens arrangement.

The microscopic convex lens structure shown in FIG. 5A is a structure in which rectangular-shaped microscopic convex lenses 9111, 9112, 9121, and so on re arranged in a square matrix arrangement, and a value of the aspect ratio is larger than 1.

In the microlens arrays 92, 93, 94, and 95 shown in FIGS. 5B, 5C, 5D, and 5E, respectively, the microscopic convex lens structure is a honeycomb type arrangement.

Figure 5B:
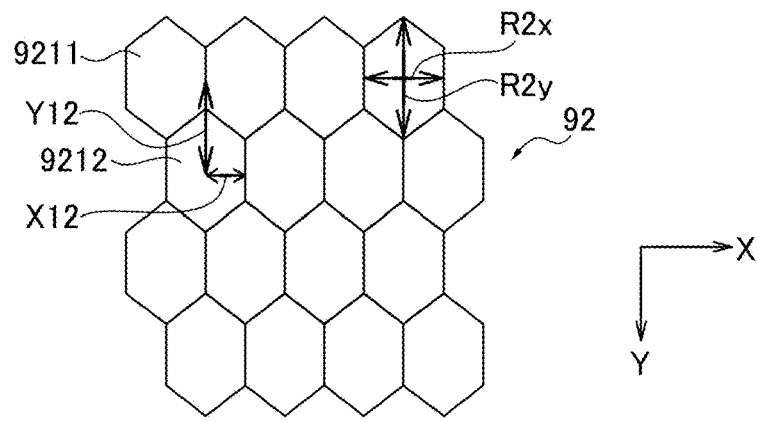
Figure 5C:
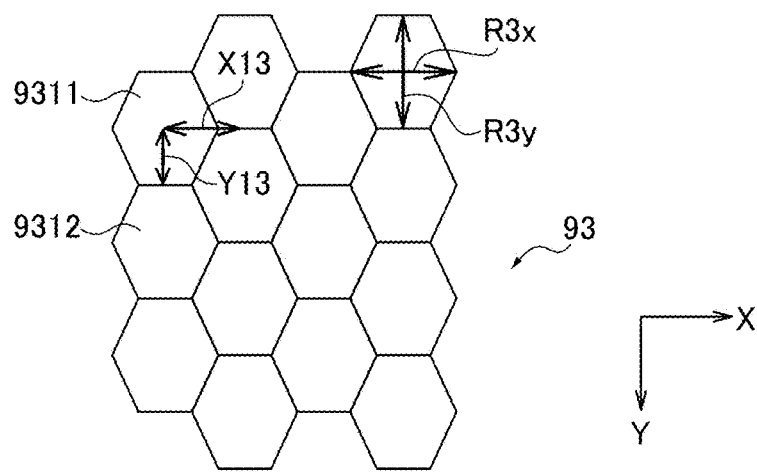
Figure 5D:
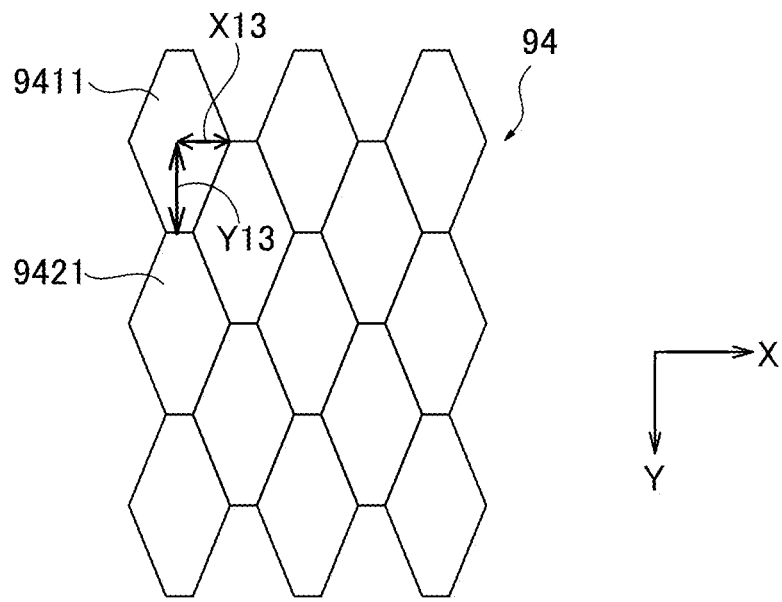
Figure 5E:
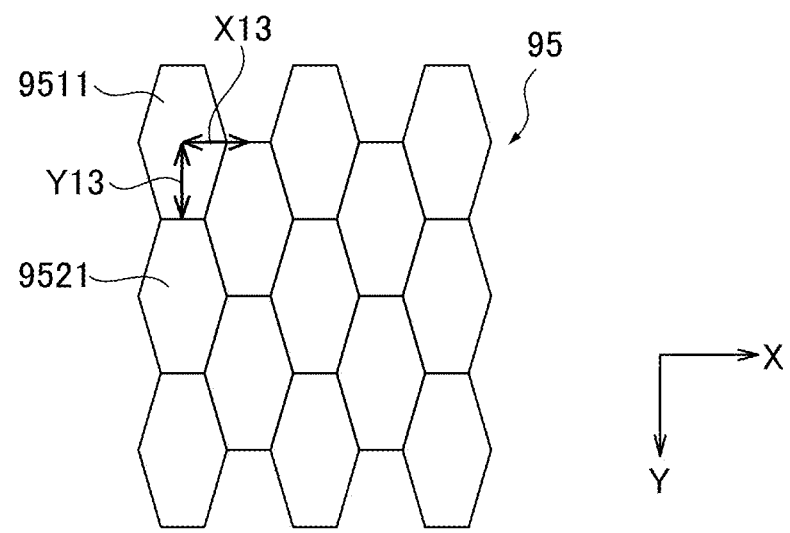

In the honeycomb type arrangement shown in FIGS. 5B, 5D, 5E, values of the aspect ratio which are expressed by "Y12/X12" and "Y13/X13" are larger than 1.

In each of five examples of the microscopic lens structures shown in FIGS. 5A to 5E, the length in the Y-axis direction of the microscopic convex lens is larger than the length in the X-axis direction.

In such a case of the microscopic convex lens in which the length in the Y-axis direction is larger than the length in the X-axis direction, as a shape of the microscopic convex lens, it is easy to make a curvature in the X-axis direction larger than a curvature in the Y-axis direction.

Therefore, it is easy to achieve the above-described anamorphic optical function in which the power in the X-axis direction becomes larger than the power in the Y-axis direction.

For example, in a case of an example shown in FIG. 5A, specifically for instance, when X11=150 μm and Y11=200 μm, a value of the aspect ratio is expressed by 200/150=4/3, and the value is larger than 1 (4/3>1).

Needless to say, in this case, a beam diameter of a pixel display beam in the X-axis direction is less than 150 μm, and that in the Y-axis direction is less than 200 μm.

The arrangements of the microscopic convex lenses shown in FIGS. 5B to 5E are honeycomb type arrangements, and each of the microscopic convex lenses has a shape elongated in the Y-axis direction.

The arrangement shown in FIG. 5B is a zig-zag type, and each of the arrangements shown in FIGS. 5C to 5E is an armchair type.

Needless to say, a zig-zag type elongated honeycomb arrangement shown in FIG. 5B and an armchair type elongated honeycomb arrangement shown in FIG. 5C are usable.

However, an example of the arrangement shown in FIG. 5C has the following advantages compared to an example of the arrangement shown in FIG. 5B.

That is, compared to the arrangement shown in FIG. 5B, in the arrangement shown in FIG. 5C, a difference between the size in the X-axis direction and the size in the Y-axis direction in the microscopic convex lens is small, and a difference between the effective pixel pitch in the vertical direction and the effective pixel pitch in the horizontal direction becomes small.

Specific measurements will be described.

For example, in FIG. 5B, a lens diameter R2x in the X-axis direction of each of microscopic convex lenses 9211,

9212, and so on is 100 μm, and a lens diameter R2y in the Y-axis direction of each of those is 200 μm.

At this time, an effective pixel pitch (=X12) in the X-axis direction is 50 μm, and an effective pixel pitch (=Y12) in the Y-axis direction is 150 μm.

Likewise, in FIG. 5C, a lens diameter R3x in the X-axis direction of each of microscopic convex lenses 9311, 9312, and so on is 100 μm, and a lens diameter R3y in the Y-axis direction of each of those is 200 μm.

Additionally, the length of each of upper and lower sides of the hexagonal shape of each of the microscopic convex lenses 9311 and so on is 50 μm.

At this time, an effective pixel pitch (=X13) in the X-axis direction is 75 μm, and an effective pixel pitch (=Y13) in the Y-axis direction is 100 μm.

Therefore, the effective pixel pitches in the X-axis and Y-axis directions are closer to each other in value in a case of the arrangement (75 μm and 100 μm) in FIG. 5C than in a case of the arrangement (50 μm and 100 μm) in FIG. 5B.

In each of FIGS. 5C to 5E, an effective pixel pitch in the X-axis direction is X13, and an effective pixel pitch in the Y-axis direction is Y13.

This is because pixel pitches in the X-axis direction and pixel pitches in the Y-axis direction are similarly defined in the honeycomb type arrangement (armchair type honeycomb arrangement) in FIGS. 5C to 5E.

In FIG. 5D, in each of microscopic convex lenses 9411, 9421, and so on, upper and lower sides parallel to the X-axis direction are short, and oblique sides are long.

Additionally, in FIG. 5E, in each of microscopic convex lenses 9511, 9521, and so on, upper and lower sides parallel to the X-axis direction are short, and oblique sides are long.

As shown in those drawings, by deformation of the hexagonal shape of the microscopic convex lens, the pixel pitch X13 in the X-axis direction and the pixel pitch Y13 in the Y-axis direction are adjustable.

Similarly to a case of FIG. 5C, also in the arrangements shown in FIGS. 5D and 5E, a microscopic convex lens having a vertically-long shape makes it possible to equalize the effective pixel pitches in the X-axis and Y-axis directions.

Figure 8:
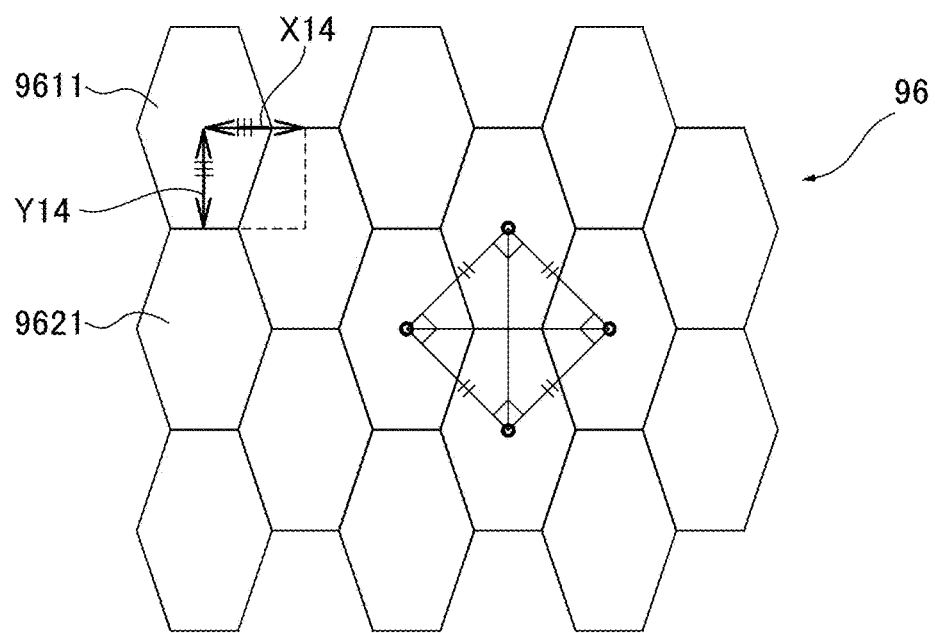
FIG. 8 is a diagram explaining another example of microscopic convex lens arrangement.

For example, each of microlenses 9611, 9621, and so on of a microlens array 96 shown in FIG. 8 has a vertically-long hexagonal shape similar to the microlens array 95 shown in FIG. 5D.

Arrangement of the microlenses 9611 and so on shown in FIG. 8 is an armchair type vertically-long honeycomb arrangement similar to that in FIG. 5C.

The hexagonal shape of each of the microlenses 9611 and so on is set such that an effective pixel pitch X14 in the X-axis direction and an effective pixel pitch Y14 in the Y-axis direction are completely equal.

Thus, in the armchair type vertically-long honeycomb arrangement, it is possible to set a value of the aspect ratio to be 1. In a case of a microscopic convex lens which is larger than a beam diameter of a pixel display beam or a microscopic convex lens which has approximately the same size as the beam diameter of the pixel display beam, if a value of the aspect ratio of an effective pixel pitch is 1, with respect to image data to be projected as a virtual image, reproducibility by the virtual image is enhanced. Because it is possible to match a pixel pitch on a microlens array of image data to be projected as a virtual image and an effective pixel pitch, or it is possible to approximate the effective pixel pitch to the pixel pitch on the microlens array of the image data to be projected as the virtual image, compared to other effective pixel pitch.

While the two-dimensional-deflecting device 6 performs one reciprocating swinging movement (swinging movement of a first shaft) with respect to one shaft, the two-dimensional-deflecting device 6 performs a plurality of reciprocating swinging movements (swinging movements of a second shaft) with respect to the other shaft; however, in many cases, the X-axis direction as the longitudinal direction of an enlarged virtual image is set to be a scanning direction with respect to the microlens array of the pixel display beam LC by the swinging movements of the second shaft. Therefore, the upper and lower sides parallel to the X-axis direction of the microlens of the hexagonal shape of the armchair type become approximately parallel to the scanning direction with respect to the microlens array of the pixel display beam LC, and a shape in which a distance between two sides closest to parallel to the scanning direction with respect to the microlens array of the pixel display beam of the hexagonal shape of the armchair type, in other words, a distance between a side closest to parallel to the scanning direction with respect to the microlens array of the pixel display beam and a side opposite thereto is extended to be enlarged in a direction perpendicular to those two sides is an armchair type vertically-long honeycomb structure.

Therefore, the armchair type vertically-long honeycomb arrangement, in addition to improvements of brightness and the number of effective pixels, makes it possible to reduce a difference between the effective pixel pitch in the X-axis direction (horizontal direction) and the effective pixel pitch in the Y-axis direction (vertical direction).

For example, in order to control a divergence angle of a divergence beam flux, the shapes of the microscopic convex lens as shown in FIGS. 5C to 5E can be selected arbitrarily.

In the head-up display device shown in FIG. 1A, the pixel display beam LC is orthogonally incident on the microscopic convex lens structure of the scanned surface element 8.

However, an incident manner of a pixel display beam on a scanned surface element is not limited to such orthogonal incidence.

Figure 7A:
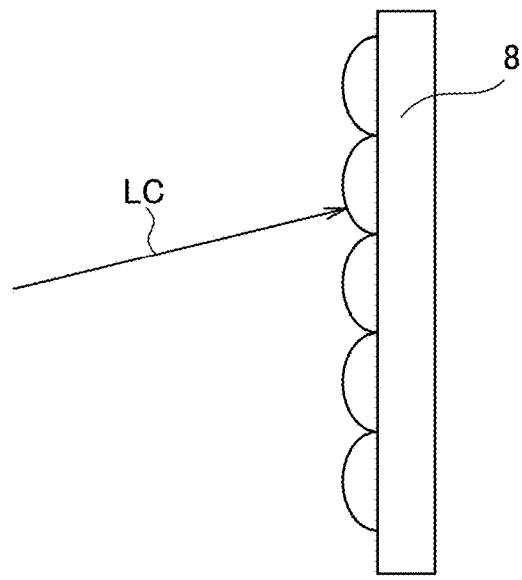
FIGS. 7A and 7B are diagrams explaining two examples of a scanned surface element.

For example, in a case of varying an arrangement of an optical element from a light source part to a reflecting surface element and miniaturizing a head-up display device, an incident manner as shown in FIG. 7A is considered.

That is, in an example of FIG. 7A, the pixel display beam LC is incident obliquely with respect to the scanned surface element 8.

In a case where a lens surface of a microscopic convex lens is an aspherical surface, the pixel display beam LC is incident obliquely with respect to an optical axis of the aspherical surface, and there is a case where a function of the aspherical surface is not utilized.

Figure 7B:
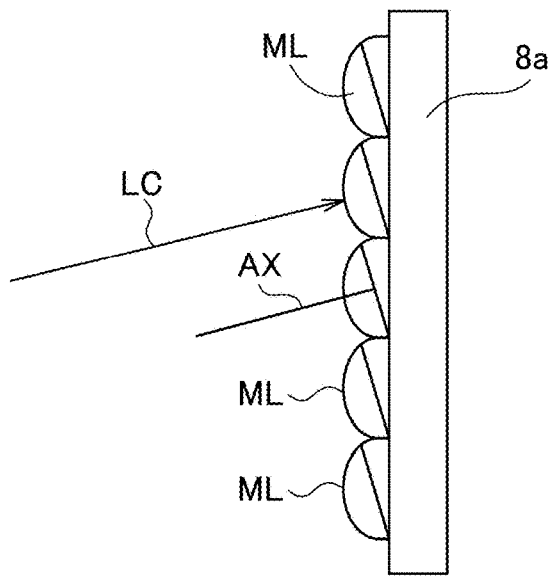

In such a case, as a scanned surface element 8a shown in FIG. 7B, an optical axis AX of a lens surface of a microscopic convex lens ML is preferably inclined from an orthogonal direction with respect to a reference surface of the scanned surface element 8a.

Thus, the optical axis AX of the lens surface can be parallel to or a direction close to an incident direction of the pixel display beam LC.

Note that the reference surface of the scanned surface element 8a is a surface on which microscopic convex lenses are arranged in an array arrangement.

This makes it possible to achieve miniaturization of an optical system, and improve use efficiency of light, and therefore, it is possible to equalize diverging directions of the pixel display beam by the microscopic convex lenses.

The above-explained head-up display device can be mounted not only on the above automobile, but also on various drivable mobile objects such as a train, a ship, a helicopter, an airplane, and the like. For example, it is possible to make a windbreak of a motor-bike a transmitting-reflecting member.

In this case, a windshield in front of a driver's seat may be a reflecting surface element.

Needless to say, the head-up display device can be carried out as an image display device for watching a movie.

A microscopic convex lens of a microscopic lens structure is for diffusing a pixel display beam as described above; however, a case of performing diffusion in only one direction of two directions of the X-axis and Y-axis directions is considered.

In such a case, a microscopic convex oval surface can be used as a lens surface of the microscopic convex lens.

Note that forming the shape of the microscopic convex lens to be hexagonal and the arrangement of the microscopic convex lens to be arranged in the honeycomb type arrangement is conventionally known in reference to a production method of a microlens array.

The above-explained image display device 1000 is an image display device in which an image in formed by light from a semiconductor laser, and image light after forming the image is incident on a transmitting-reflecting member (reflecting surface element 10), and the semiconductor laser is arranged such that there are more S polarization components of the image light incident on the transmitting-reflecting member with respect to the transmitting-reflecting member than P polarization components.

In this case, compared to a case if S polarization components of the image light incident on the transmitting-reflecting member with respect to the transmitting-reflecting member are less than or equal to P polarization components, it is possible to improve visibility of a virtual image.

Additionally, since an effective cross-section of the image light incident on the transmitting-reflecting member is horizontally long, compared to a case where the effective cross-section of the image light is vertically long, it is possible to improve visibility of the virtual image.

Additionally, in the image display device 1000, especially in a case where the image is horizontally long, it is possible to improve use efficiency of light.

Additionally, the image display device includes a light source (semiconductor laser) which emits light in which there are more polarization components (polarization components in which an oscillation direction of an electric field is vertical to a YZ-plane) corresponding to S polarization components of image light incident on the transmitting-reflecting member than polarization components (polarization components in which an oscillation direction of an electric field is parallel to a YZ-plane) corresponding to P polarization components.

In this case, it is possible to reflect more light emitted from a light source toward an observer (driver of a mobile object) by the transmitting-reflecting member. In addition, for example, compared to a case where under conditions in which a light amount of light emitted from the light source is constant and a ratio of polarization components corresponding to S polarization components of the light with respect to the transmitting-reflecting member to the light and a ratio of polarization components corresponding to P polarization components with respect to the transmitting-reflecting member to the light are equal, the light is incident on a polarization filter, only the S polarization components are transmitted, and incident on the transmitting-reflecting member, there is little loss of the light amount, and it is possible to increase a light amount of reflected light from the transmitting-reflecting member. That is, it is possible to improve use efficiency of light.

Additionally, by making a ratio of the polarization components corresponding to the S polarization components to the light emitted from the light source to be approximately 100%, it is possible to improve visibility of a virtual image maximally.

Additionally, a far-field pattern of the light emitted from the light source has a longitudinal direction, and therefore, it is possible to make light in which an effective cross-section is horizontally long to be comparatively easily incident on the transmitting-reflecting member.

Additionally, the image display device 1000 includes an optical element (scanned surface element 8) which is arranged on an optical path between the light source and the transmitting-reflecting member, and rotates the longitudinal direction of the effective cross-section of the light emitted from the light source at approximately an angle of 90 degrees.

In this case, even if the far-field pattern of the light emitted from the light source is vertically long, the light can be incident on the transmitting-reflecting member in a state where the effective cross-section is horizontally long.

Additionally, the image display device 1000 includes a two-dimensional-deflecting device 6 which is arranged on the optical path between the light source and the transmitting-reflecting member, and two-dimensionally deflects the light emitted from the light source. The optical element includes a microlens array having a plurality of microlenses on which the image is formed by the light deflected by the two-dimensional-deflecting device 6. In each of the plurality of microlenses, curvatures regarding the X-axis direction (right-left direction) and the Y-axis direction (up-down directions) perpendicular to each other in a plane perpendicular to an optical axis (Z-axis) are different. More specifically, in each micro lenses, the curvature regarding the X-axis direction (right-left direction) is larger than the curvature regarding the Y-axis direction (up-down direction).

In this case, it is possible to transform an effective cross-section of the light incident on each microlens from vertically long to horizontally long, and further improve visibility of a virtual image.

Additionally, the light source is a semiconductor laser, and therefore, it is possible to easily take light of low-power and high-brightness.

Therefore, in a mobile object on which an image display device 100 excellent in visibility of a virtual image is mounted, it is possible to promptly and reliably recognize navigation information which is visibly displayed via the transmitting-reflecting member while driving.

Note that in a case where an incidence angle of image light which is incident on the transmitting-reflecting member is in the vicinity of Brewster's angle, that is, for example, in a case where the incidence angle is from Brewster's angle−10 degrees to Brewster's angle+10 degrees, particularly, the image display device 1000 is favorable. In this case, since reflectance of P polarization components at the transmitting-reflecting member is extremely low, it is extremely effective to increase S polarization components of the image light which is incident on the transmitting-reflecting member more than the P polarization components.

As described above, in a microlens array as the scanned surface element 8, a divergence angle in the X-axis direction is preferably larger than that in the Y-axis direction. In this case, a value of an aspect ratio of each microlens (effective pixel pitch in the Y-axis direction/effective pixel pitch in the X-axis direction) is larger than 1, and in particular, when the length in a vertical direction of an image formed in the microlens array is Y, and the length in the horizontal direction is X, a value of Y/X is preferably larger than 1 (Y/X>1). As a result, the curvature in the X-axis direction of the microlens is larger than the curvature in the Y-axis direction. In this case, the divergence angle in the horizontal direction becomes larger, and a field angle of a horizontally-long image which is necessary for a head-up display device is effectively satisfied, and it is possible to improve brightness.

Note that the structure of the above-described image display device is suitably changeable. For example, as the scanned surface element 8, in place of the microlens array, or a transmission type screen (not having microlenses) which transmits image light, a reflection type screen (not having microlenses) which reflects image light may be used. Or a diffuser plate may be used. In this case, for example, a light source (for example, LD) is arranged such that a far-field pattern of emission light is horizontally long, and image light in which an effective cross-section is horizontally long may be incident on the reflecting surface element 10.

Additionally, an image display device may include, for example, any one of a transmission type liquid crystal panel, a reflection type liquid crystal panel, a DMD (Digital Micromirror Device), in place of the two-dimensional-deflecting device 6, the concave mirror 7, the scanned surface element 8, and the concave mirror 9. In any case, on a transmitting-reflecting member (for example, a windshield of a mobile object), image light in which there are more S polarization components with respect to the transmitting-reflecting member than P polarization components only has to be incident. Additionally, an effective cross-section of the image light incident on the transmitting-reflecting member is preferably horizontally long. In those cases, as a light source, for example, a lamp can be used.

Additionally, in an image display device, as a light source, in place of the edge emitting laser, for example, a light-emitting diode, an organic EL element, a vertical cavity surface emitting laser (VCSEL) which is one type of semiconductor laser, or the like may be used. In this case, even if a far-field pattern of emission light does not have a longitudinal direction (for example, even in a case of a circle, or a regular polygon), image light in which an effective cross-section is horizontally long is emitted from each microlens of the microlens array.

Additionally, in place of or in addition to the microlens array, at least one optical element (for example, a lens in which a curvature regarding the X-axis direction and a curvature regarding the Y-axis direction are different) which rotates a longitudinal direction of an effective cross-section of light emitted from a light source at approximately an angle of 90 degrees (inverts the longitudinal direction and a transverse direction of the effective cross-section) may be provided. The optical element may be provided, for example, before or behind the two-dimensional-deflecting device 6. However, in a case where the optical element is provided behind the two-dimensional-deflecting device 6, that is, in a case where the optical element is provided on an optical path of the deflected light, it is favorable that a lens array include a relatively large single lens which forms a scanned surface, or a plurality of lenses having the size equivalent to the lens. In this case, the curvature regarding the X-axis direction of each microlens of the microlens array and the curvature regarding the Y-axis direction may be the same (for example, a circular or regular polygonal microlens). That is, each microlens may be a lens which diffuses an incident laser beam approximately equally in all directions. Further, in addition to the microlens array, in a case of providing the optical element, the curvature regarding the X-axis direction of each microlens may be less than the curvature regarding the Y-axis direction.

Additionally, in an image display device, in a case where a light source is arranged such that a far-field pattern of emission light is horizontally long, an even number of or no optical elements which rotate a longitudinal direction of an effective cross-section of light emitted from the light source at approximately an angle of 90 degrees (reverse the longitudinal direction and a transverse direction of the effective cross-section) may be provided so that image light in which an effective cross-section is horizontally long can be incident on a transmitting-reflecting member.

On the other hand, in an image display device, in a case where a light source is arranged such that a far-field pattern of emission light is vertically long, it is favorable that an odd number of optical elements which rotate a longitudinal direction of an effective cross-section of light emitted from the light source at approximately an angle of 90 degrees (reverse the longitudinal direction and a lateral direction of the effective cross-section) be provided so that image light in which an effective cross-section is horizontally long can be incident on a transmitting-reflecting member.

Additionally, in an image display device, in a case where a far-field pattern of emission light from a light source does not have a longitudinal direction, it is favorable that an optical element which makes an effective cross-section of light emitted from the light source to be horizontally long be provided so that image light in which an effective cross-section is horizontally long can be incident on a transmitting-reflecting member.

Additionally, the microlens array includes a plurality of microlenses two-dimensionally arranged; however, in place of those, the microlens array may include a plurality of microlenses one-dimensionally arranged. In this case, as a light-deflecting device to scan the microlens array by light, a one-dimensional deflecting device may be used. As the one-dimensional deflecting device, for example, a one-axis scanner including a polygon mirror, a Galvano mirror, and a MEMS mirror, or the like is used.

Additionally, the reflecting surface element 10 is not limited to only a windshield of a mobile object, but may also be a side glass, a rear glass, or the like. That is, it is only necessary to be a window member to visually recognize outside of the mobile object. Additionally, the transmitting-reflecting member is not limited to a glass material member, that is, it is only necessary to be a member which has characteristics of transmitting a part of light and reflecting a part of the rest of the light.

Additionally, for example, the reflecting surface element 10 may be a transmitting-reflecting member such as a combiner which is arranged in front of a window member provided in a mobile object as viewed from an observer (driver).

Additionally, the light source part 100 has three semiconductor lasers corresponding to three primary colors of light; however, it is not limited thereto, that is, it is only necessary to have at least one light source (for example, a semiconductor laser).

That is, an image display device is not limited to only a device which displays a color image, but may also be a device which displays a monochrome image.

Additionally, arrangement of a light source (for example, a semiconductor laser) is not limited to the arrangement shown in FIG. 1B, and that is, it is only necessary to be arranged such that there are more S polarization components of image light incident on a transmitting-reflecting member with respect to the transmitting-reflecting member (for example, the reflecting surface element 10) than P polarization components. Additionally, in accordance with the arrangement of the light source, the structure and arrangement of an optical system of the light source part 100 is suitably changeable.

Additionally, arrangement of a plurality of microscopic convex lenses (for example, microlenses) of the scanned surface element 8 (for example, a microlens array) is not limited to only the arrangement shown in FIG. 1A (a two-dimensional arrangement along a predetermined plane surface parallel to an XY-plane), but the microlenses may also be two-dimensionally arranged along a predetermined plane surface perpendicular to the XY-plane, for example. As a specific example, the microlenses of the microlens array may be two-dimensionally arranged along a predetermined plane surface parallel to an XZ-plane such that light is incident from a +Y direction with respect to the microlens array and light transmitted through the microlens array in a −Y direction is guided to the reflecting surface element 10 by at least one mirror. In this case, if a curvature regarding an X-axis direction (horizontal direction) of each microlens is larger than a curvature regarding a Z-axis direction (vertical direction), horizontally-long light can be incident on the reflecting surface member 10.

Additionally, in the above explanation, the right-left direction (X-axis direction) as viewed from the driver 11 of the mobile object is referred to as the horizontal direction, and each of the front-rear direction (Z-axis direction) and the up-down direction (Y-axis direction) as viewed from the driver 11 of the mobile object is referred to as the vertical direction. However, depending on arrangement of a light source, a microlens array, or the like, it is preferable that the directions be referred suitably. For example, in a case where a light source (for example, LD) is arranged such that a longitudinal direction of an emission surface is parallel to the Z-axis and a transverse direction is parallel to the Y-axis direction, each of the X-axis direction and the Z-axis direction may be referred to as a horizontal direction, and the Y-axis direction may be referred to as a vertical direction. Additionally, for example, in a case where the plurality of microlenses of the microlens array are two-dimensionally arranged along the predetermined plane surface parallel to the YZ-plane, each of the X-axis direction and the Z-axis axis direction may be referred to as a horizontal direction, and the Y-axis direction may be referred to as a vertical direction.

Additionally, an effective cross-section of image light incident on a transmitting-reflecting member is not limited to only being horizontally long, but may also be vertically long, and may not have a longitudinal direction. Specifically, a light source (for example, LD) is arranged such that a far-field pattern of emission light is vertically long, and an image is formed by light in which an effective cross-section is vertically long, and image light in which the effective cross-section is vertically long after forming the image may be incident on the reflecting surface element 10. Additionally, for example, an image is formed by light emitted from a VCSEL in which an effective cross-section is approximately circular, and image light after forming the image in which the effective cross-section is circular may be incident on the reflecting surface element 10. However, in any case, a light source (for example, LD) is preferably arranged such that there are more S polarization components of the image light incident on the reflecting surface element 10 with respect to the reflecting surface element 10 than P polarization components.

INDUSTRIAL APPLICABILITY

The image display device 1000 can be applied to, for example, a head-mounted display. In this case, as the reflecting surface element 10, a small transmitting-reflecting member can be used.

Although the present invention has been described in terms of exemplary embodiments, it is not limited thereto. It should be appreciated that variations may be made in the embodiments described by persons skilled in the art without departing from the scope of the present invention defined by the following claims.

CROSS-REFERENCE TO RELATED APPLICATIONS

The present application is based on and claims priority from Japanese Patent Application Number 2014-020221, filed Feb. 5, 2014, the disclosure of which is hereby incorporated by reference herein in its entirety.

The invention claimed is:

1. An image display device, comprising:
    a laser light source;
    an optical element; and
    a transmitting-reflecting member,
    wherein the image display device displays an image by forming the image by light that is emitted from the laser light source and makes image light after forming the image be incident on the transmitting-reflecting member,
    wherein the laser light source is arranged such that there are more S polarization components of the image light that is incident on the transmitting-reflecting member with respect to the transmitting-reflecting member than P polarization components,
    wherein the optical element is arranged on an optical path between the laser light source and the transmitting-reflecting member, and is a lens array which includes a plurality of lenses on which the image is formed,
    an effective cross-section of the light that is emitted from the laser light source is one of vertically long and horizontally long with respect to the transmitting-reflecting member, and
    an effective cross-section of light that has been transmitted through the lens array is the other of horizontally long and vertically long with respect to the transmitting-reflecting member.

2. The image display device according to claim 1, wherein each of the plurality of lenses is arranged such that the direction of a long diameter and the direction of a short diameter of the effective cross-section of the light which is emitted from the laser light source are reversed before and after the light which is emitted from the laser light source is transmitted through each of the lenses.

3. The image display device according to claim 2, wherein each of the plurality of lenses has different curvatures regarding first and second directions which are perpendicular to each other in a plane perpendicular to an optical axis.

4. The image display device according to claim 3, wherein the direction of the short diameter of the effective cross-section of the light which is emitted from the laser light source coincides with a direction of one of the first and second directions of each of the lenses in which a curvature is larger.

5. The image display device according to claim 2, wherein the image includes a long axis direction and a short axis direction and the long axis direction of the image is aligned with a long diameter direction of an effective cross-section of light which passed through the plurality of lenses.

6. The image display device according to claim 1, wherein an effective cross-section of the image light which is incident on the transmitting-reflecting member is horizontally long.

7. The image display device according to claim 1, wherein the effective cross-section is a portion in which a relative intensity is 20% to 80% in a cross-section of light in the optical path between the laser light source and the transmitting-reflecting member.

8. The image display device according to claim 1, wherein the image is horizontally long.

9. The image display device according to claim 1, wherein a ratio of the S polarization components to the light which is emitted from the laser light source is 100%.

10. The image display device according to claim 1, wherein an incidence angle of the image light which is incident on the transmitting-reflecting member is approximately Brewster's angle.

11. The image display device according to claim 1, wherein the laser light source is a semiconductor laser.

12. A mobile object which is driven by a driver, comprising:
    the image display device according to claim 1,
    wherein the driver visually recognizes a virtual image of the image via the transmitting-reflecting member.

13. The mobile object according to claim 12, wherein the transmitting-reflecting member is a window member through which the driver visually recognizes outside of the mobile object.

* * * * *